US 8,810,176 B2

(12) United States Patent
Kawakami et al.

(10) Patent No.: US 8,810,176 B2
(45) Date of Patent: Aug. 19, 2014

(54) CONVERTER CONTROL DEVICE FOR VEHICLE

(75) Inventors: Eiichiro Kawakami, Chiryu (JP);
Takeshi Itoh, Nagoya (JP)

(73) Assignee: Denso Corporation, Kariya (JP)

( * ) Notice: Subject to any disclaimer, the term of this patent is extended or adjusted under 35 U.S.C. 154(b) by 238 days.

(21) Appl. No.: 13/486,619

(22) Filed: Jun. 1, 2012

(65) Prior Publication Data

US 2012/0306415 A1 Dec. 6, 2012

(30) Foreign Application Priority Data

Jun. 3, 2011 (JP) .................................. 2011-125514
Dec. 2, 2011 (JP) .................................. 2011-264979

(51) Int. Cl.
*H02H 7/09* (2006.01)
*H02P 6/10* (2006.01)

(52) U.S. Cl.
CPC ........................................ *H02P 6/10* (2013.01)
USPC . 318/400.22; 318/504; 318/629; 318/400.23; 363/21.02; 363/21.03; 363/56.05; 323/282; 323/244; 323/246

(58) Field of Classification Search
CPC .... B62D 5/0463; B62D 5/046; Y02T 10/642; Y02T 10/7005; Y02T 10/7077; Y02T 10/7216; B60W 10/08; H02P 21/06; H02P 23/08; H02P 2207/01; H02P 6/10; H02P 6/14; H02P 6/08; H02P 6/001; H02P 6/085; H02P 6/00; H02P 2201/09; H02P 2201/11; H02K 29/08; Y02B 70/1441; Y02B 70/1443; Y02B 70/145; H02M 1/4225; H02M 2007/4815; H02M 3/1582; H02M 3/24; H02M 3/33584; B60L 11/005; B60L 2210/14; B60L 2210/10

USPC ............... 318/400.3, 432, 802; 323/207, 282, 323/320, 222, 285, 288; 180/65.285; 363/16, 17, 21.03, 21.02, 132, 244, 363/246
See application file for complete search history.

(56) References Cited

U.S. PATENT DOCUMENTS

2009/0278483 A1  11/2009  Egami
2009/0279337 A1* 11/2009  Hamatani ..................... 363/132
2010/0244798 A1*  9/2010  Nakatomi et al. ............ 323/282

FOREIGN PATENT DOCUMENTS

JP        04-121059     4/1992
JP        2000-41381    2/2000
JP        2000-194404   7/2000

(Continued)

OTHER PUBLICATIONS

Office Action (1 page) dated Aug. 6, 2013, issued in corresponding Japanese Application No, 2011-264979 and English translation (2 pages).

*Primary Examiner* — Shawki S Ismail
*Assistant Examiner* — Jorge L Carrasquillo
(74) *Attorney, Agent, or Firm* — Nixon & Vanderhye PC

(57) ABSTRACT

A boost control section for controlling a converter includes a PI control section and a resonance suppression section. The PI control section calculates a basic command value based on a deviation between a drive voltage generated by the converter and a target voltage to equalize the drive voltage and the target voltage. The resonance suppression section calculates, based on the state of variation of the drive voltage, a correction value for correcting the basic command value to suppress the variation. The basic command value is corrected by adding the correction value. First and second drive pulses corresponding to the corrected command value are outputted to the converter.

14 Claims, 18 Drawing Sheets

(56) References Cited

FOREIGN PATENT DOCUMENTS

| | | |
|---|---|---|
| JP | 2005-086845 | 3/2005 |
| JP | 2006-136169 | 5/2006 |
| JP | 2006136169 A * | 5/2006 |
| JP | 2010-268626 | 11/2010 |

* cited by examiner

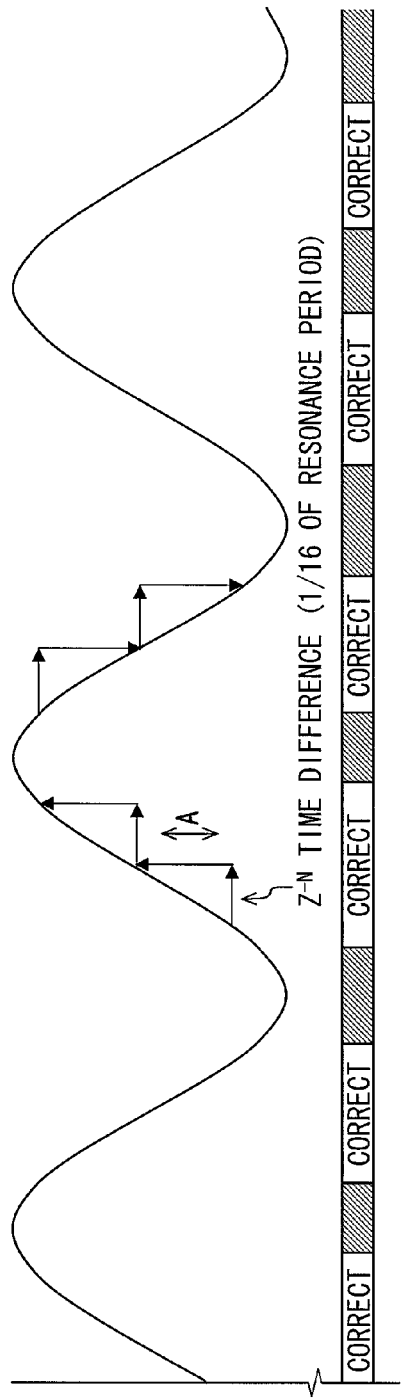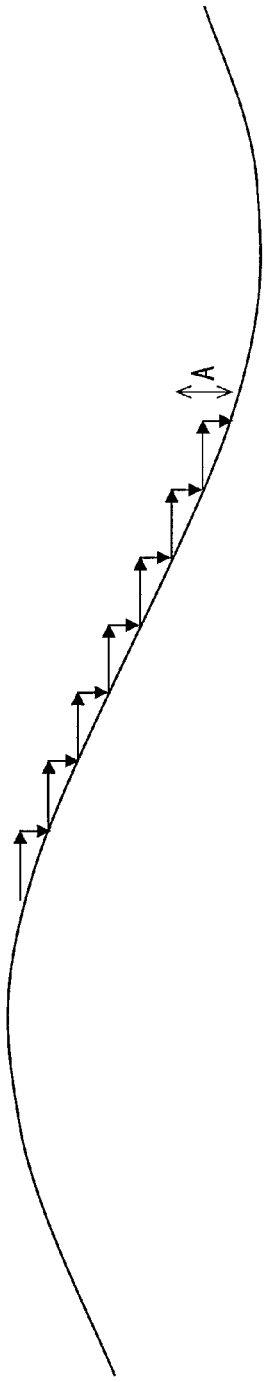

CONVERTER CONTROL DEVICE FOR VEHICLE

CROSS REFERENCE TO RELATED APPLICATION

This application is based on and incorporates herein by reference Japanese patent applications No. 2011-125514 field on Jun. 3, 2011 and No. 2011-264979 filed on Dec. 2, 2011.

FIELD

The present disclosure relates to a converter control device for a vehicle for controlling a converter, which generates, by converting a DC voltage supplied from a DC power source, a DC drive voltage for driving a motor.

BACKGROUND

Various hybrid vehicles and electric vehicles are proposed. The hybrid vehicle has both an internal combustion engine and a motor as drive sources. The electric vehicle has no internal combustion engine and but has only a motor. Among drive systems for driving a motor used as a vehicle drive source, for example, JP 2009-273286A (US2009/0278483 A1) proposes one drive system.

In this proposed drive system, a DC voltage supplied by a high-voltage battery is converted (boosted) into a predetermined drive voltage by a booster circuit, the drive voltage thus generated is converted into a three-phase AC voltage by an inverter, and the three-phase AC voltage is supplied to a three-phase synchronous motor to drive the motor.

The basic configuration of a booster circuit is generally known. As also described in JP 2009-273286A (US2009/0278483 A1), a switching element is turned on and off to repeat accumulating and discharging the energy of a high-voltage battery in and from a reactor (coil) so as to boost a DC voltage. The booster circuit is provided with a capacitor in an output stage thereof for use in output voltage smoothing.

In the drive systems configured as described above, motor torque variation is caused by various factors. For example, sixth-order variation of a motor current period occurs depending on the structure of a three-phase AC motor. Also, to control the inverter included in such a drive system, it is necessary to detect the current supplied to the motor using a current sensor. An offset error of the current sensor and errors of an interface circuit to which the current data detected by the current sensor is inputted can cause periodic torque variation (first-order variation) synchronized with the electric angular period of the motor. Furthermore, second-order torque variation of a frequency two times that of the first-order variation is caused, for example, by gain errors of the current sensor. Of these torque variations, the first-order variation most affects the booster circuit.

The power supplied to a motor (motor power) depends on the product of motor torque and rotation speed. Therefore, when the motor torque periodically varies as described above, the motor power supplied to the motor also varies periodically, thereby causing the voltage inputted to the inverter (i.e., the drive voltage outputted from the booster circuit) to periodically vary.

That is, when the motor torque varies, the drive voltage outputted from the booster circuit correspondingly varies. With respect to the first-order variation in particular, the frequency of torque variation changes corresponding to the rotation speed of the motor (the electrical angular frequency, to be specific). For example, in the case of a three-phase AC motor having six pole pairs with a maximum speed of 20,000 rpm, the torque variation frequency changes in a range of about 0 to 2 kHz.

The booster circuit, on the other hand, has a reactor and a smoothing capacitor. That is, the booster circuit includes an LC resonance circuit. Of the reactor and the smoothing capacitor, the smoothing capacitor is used also to reduce the ripple of the current inputted to the motor. The capacitor is thus required to have a capacitance C of, for example, about several hundred µF. As for the reactor, it is required to have an inductance L of, for example, about several hundred µH in order to suppress excess voltage applied to the switching element used for boosting and thereby reduce the cost of the switching element. When a booster circuit with a boost ratio of 1:2 is configured using a smoothing capacitor having a capacitance C of 500 µF and a reactor having an inductance L of 300 µH, the resonance frequency of the booster circuit is about 205 Hz as calculated using the following expression (1).

$$(1/2) \times [1/\{2\pi\sqrt{(500\mu \times 300\mu)}\}] \approx 205 \qquad (1)$$

The resonance frequency falls in the variation range (0 to 2 kHz) of the torque variation frequency of the motor described above as an example. Hence, during a vehicle travel, the torque variation frequency and the resonance frequency of the LC resonance circuit often coincide with each other. When the torque variation frequency and the resonance frequency happen to coincide with each other, the variation width of the drive voltage outputted from the booster circuit is magnified by the resonance.

Generally, conventional booster circuits have a feedback control function used to perform feedback control in which an output voltage is fed back for comparison with a target voltage and duty control is applied, for example, using a PI (proportional and integral) control unit, to a switching element so as to make the output voltage match the target voltage.

It is, however, difficult to suppress, using such known feedback control alone (for example, using a PI control unit alone), the output variation of a booster circuit caused by motor torque variation. To suppress large output variation caused by resonance, a smoothing capacitor to be used is required to have a large capacitance C. It is, however, unrealistic to use a smoothing capacitor with a large capacitance C so as to suppress the output variation of a booster circuit caused by motor torque variation. A larger smoothing capacitor eventually makes the drive system as a whole costly and larger. This problem is not limited to a booster circuit for boosting a DC voltage. The same problem may occur also with a step-down circuit for lowering a DC voltage. That is, it may occur in any converter whose output power periodically varies by being affected by a load (motor) and which has an internal LC resonance circuit.

SUMMARY

It is therefore an object to provide a converter control device for a vehicle, which suppresses output voltage variation caused by motor torque variation.

A converter control device is provided for a vehicle having a converter, which includes a resonance circuit formed of a capacitor and a coil and generates a drive voltage for driving a motor by converting a DC voltage supplied from a DC power source into a DC drive voltage at a conversion ratio determined based on an input control signal. The converter control device has a basic command value calculation section, a variation state detection section, a correction value calculation section and a control signal generation section.

The basic command value calculation section calculates a basic command value based on a target voltage to equalize a voltage generated by the converter with the target voltage. The variation state detection section detects a state of variation of the drive voltage outputted from the converter. The correction value calculation section calculates, based on the variation state of the drive voltage, a correction value for correcting the basic command value to suppress the variation of the drive voltage. The control signal generation section calculates a control command value by correcting, using the correction value, the basic command value, generates the control signal according to the control command value and outputs the control signal to the converter.

BRIEF DESCRIPTION OF THE DRAWINGS

The above and other objects will become more apparent from the following detailed description made with reference to the accompanying drawings. In the drawings:

FIGS. 8A to 8C are signal diagrams showing a relation between the variation frequency of a drive voltage VH and determination of whether to perform correction of the drive voltage VH;

DETAILED DESCRIPTION OF THE PREFERRED EMBODIMENTS

First Embodiment

Figure 1:
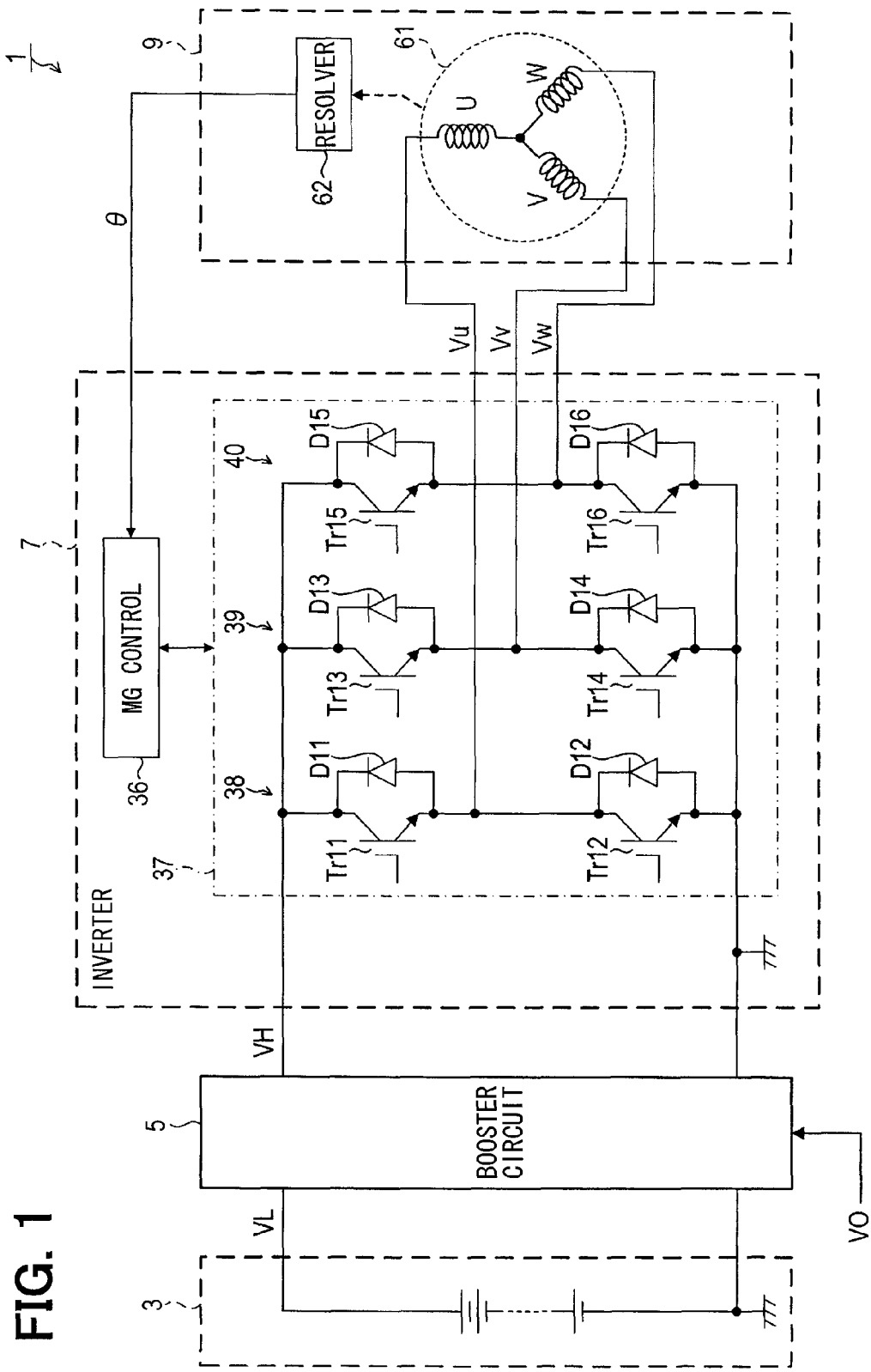
FIG. 1 is a circuit diagram showing a motor drive system for vehicle.

Referring to FIG. 1, a motor drive system 1 is installed in an electric vehicle (not shown) provided with a motor as a drive source for vehicle travel and to control driving of the motor. The motor drive system 1 includes a battery 3 as a DC power source, a booster circuit 5 for boosting a battery voltage VL of the battery 3 to a drive voltage VH higher than the battery voltage VL, an inverter 7 for converting the drive voltage VH outputted from the booster circuit 5 into three-phase AC voltages Vu, Vv and Vw, and a motor section 9 including a motor 61 for generating a vehicle driving force using the three-phase AC voltages Vu, Vv and Vw.

The battery 3 includes a secondary battery of, for example, nickel hydride or lithium ion and has a capacity enough for supplying power required to drive the motor section 9. The negative pole of the battery 3 is connected to a ground line. The battery 3 need not necessarily be a secondary battery, but may be, for example, a capacitor which involves no chemical reaction or a fuel cell.

Figure 2:
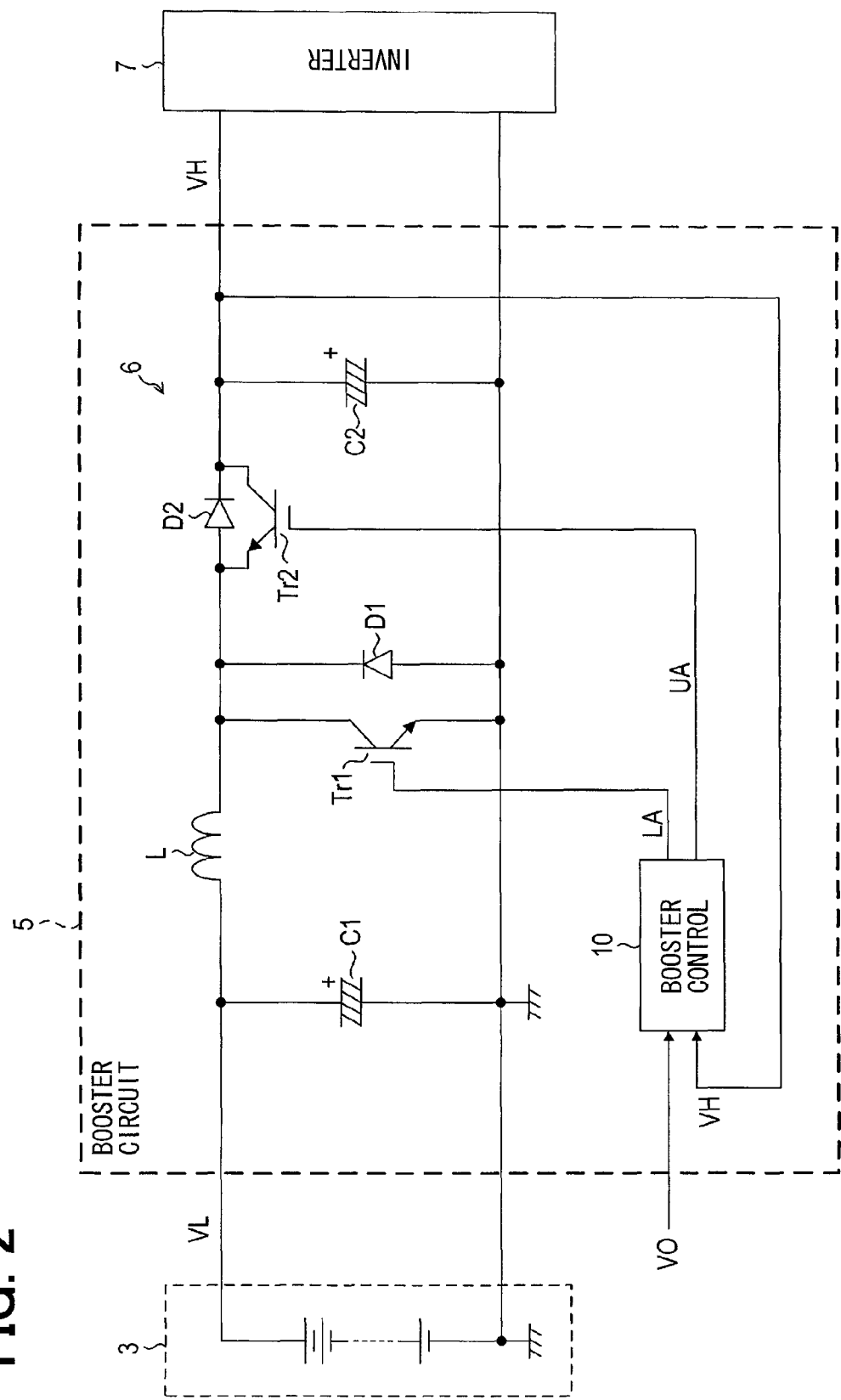
FIG. 2 is a circuit diagram showing a booster circuit in the motor drive system.

The booster circuit 5 includes, as shown in FIG. 2, a converter 6 for boosting (raising) the battery voltage VL to the drive voltage VH and a boost control section 10 for controlling operation of the converter 6.

The converter 6 has a conventional circuit configuration, which includes a filter capacitor C1, a reactor (coil) L, an insulated gate bipolar transistor (IGBT) Tr1, a diode D1, an IGBT Tr2, a diode D2 and a smoothing capacitor C2. The filter capacitor C1 is connected between the positive pole and the negative pole of the battery 3 to stabilize the battery voltage VL inputted to the converter 6 and to stabilize the voltage VL lowered when charging the battery 3, i.e., when an electric current is made to flow from the inverter 7 to the battery 3. The reactor L has one end connected to the positive pole of the battery 3. The insulated gate bipolar transistor Tr1 is a lower arm (low-potential side) switch, and has the collector connected to the other end of the reactor L and the emitter connected to the negative pole (ground line) of the battery 3. The diode D1 has the anode thereof connected to the emitter of the lower arm switch Tr1 and the cathode thereof connected to the collector of the lower arm switch Tr1. The IGBT Tr2 is an upper arm (high-potential side) switch Tr2, and has the emitter thereof connected to the other end of the reactor L (i.e., connected to the collector of the lower arm switch Tr1) and the collector thereof connected to the output terminal of the converter 6. The diode D2 has the anode thereof connected to the emitter of the upper arm switch Tr2 and the cathode thereof connected to the collector of the upper arm switch Tr2. The smoothing capacitor C2 is connected between the collector of the upper arm switch Tr2 and the ground line. The voltage between the collector of the upper arm switch Tr2 and the ground line is outputted as the drive voltage VH to the inverter 7.

The converter 6 converts (boosts) the battery voltage VL to the drive voltage VH by having control signals LA and UA inputted from the boost control section 10 to the lower and upper arm switches Tr1 and Tr2 to alternately turn the two switches on and off. The conversion ratio (boost ratio) of the converter 6 is, as being described later, dependent on the on-time ratio, i.e., the on-duty ratio, of each of the lower and the upper arm switches Tr1 and Tr2. That is, the larger the on-duty ratio of the lower arm switch Tr1 (i.e., the smaller the on-duty ratio of the upper arm switch Tr2), the larger the boost ratio. Conversely, the smaller the on-duty ratio of the lower arm switch Tr1 (i.e., the larger the on-duty ratio of the upper arm switch Tr2), the smaller the boost ratio.

The converter 6 has an LC resonance circuit formed of the reactor L and the smoothing capacitor C2. The resonance frequency f of the LC resonance circuit is represented by the following equation (2):

$$f = (1/G) \times [1/\{2\pi\sqrt{(La \times Ca)}\}] \tag{2}$$

where La is the inductance of the reactor L, Ca is the capacitance of the smoothing capacitor C2, and the boost ratio (battery voltage VL:drive voltage VH) of the converter 6 is 1:G.

The boost control section 10 functions as a converter control device for vehicle. In the converter 6, the boost control section 10 performs control to cause the battery voltage VL to be boosted to a target voltage VO. That is, as shown in FIG. 2, the boost control section 10 inputs the target voltage VO and the drive voltage VH and, based on the result of comparing the two voltages, generates and outputs the control signals LA and UA for controlling the lower and the upper arm switches Tr1 and Tr2 so as to make the drive voltage VH coincident with the target voltage VO. The configuration and functions of the boost control section 10 will be described in detail later.

The target voltage VO is calculated and inputted (received by the boost control section 10) by an electronic control unit (not shown) at a predetermined period (for example, at a control period), so that it varies according to the operating condition of the motor 61. The electronic control unit performs various kinds of control based on vehicle conditions, for example, the amount of accelerator pedal depression, gear shift position, and vehicle speed. Calculating the target voltage VO is among various functions of the electronic control unit.

The inverter 7 will be described below with reference again to FIG. 1. The inverter 7 has a conventional configuration including a six-element bridge (three-phase bridge) circuit 37 for converting the input drive voltage VH into three-phase AC voltages Vu, Vv and Vw. The three-phase bridge circuit 37 is controlled by an MG (motor-generator) control section 36 also included in the inverter 7.

The three-phase bridge circuit 37 has the conventional configuration and functions will be only briefly described below. The three-phase bridge has a U-phase arm 38, a V-phase arm 39 and a W-phase arm 40. The U-phase arm 38 is formed of serially connected U-phase upper arm switch Tr11 and U-phase lower arm switch Tr12. The V-phase arm 39 is formed of serially connected V-phase upper arm switch Tr13 and V-phase lower arm switch Tr14. The W-phase arm 39 is formed of serially connected W-phase upper arm switch Tr15 and W-phase lower arm switch Tr16. The voltages at connection points between the upper and lower arm switches of U-phase, V-phase and W-phase arms are outputted as the U-phase voltage Vu, V-phase voltage Vv and W-phase voltage Vw, respectively, to the motor section 9.

The arm switches Tr11 to Tr16 are, like the arm switches Tr1 and Tr2 included in the converter 6, IGBTs. The U-phase upper arm switch Tr11 has a diode D11 connected between the collector and emitter thereof like in the case of the arm switches Tr1 and Tr2 included in the converter 6. The other arm switches Tr12 to Tr16 similarly have diodes D12 to D16 connected between their collectors and emitters, respectively.

The arm switches Tr11 to Tr16 are turned on and off by drive signals individually inputted from the MG control section 36 to the gates. This causes the DC drive voltage VH from the booster circuit 5 to be converted into the desired three-phase AC voltages Vu, Vv and Vw used to rotationally drive the motor 61 in the motor section 9.

The MG control section 36 adjusts the three-phase voltages Vu, Vv and Vw by turning the arm switches Tr11 to Tr16 on and off so as to equalize the output torque of the motor 61 with the target torque. The MG control section 36 controls the turning on and off of the arm switches Tr11 to Tr16 based on the rotation angle θ of the motor 61 inputted from a resolver 62 included in the motor section 9, the amount of current of each phase supplied to the motor 61 and detected by current sensors (not shown) and a target torque inputted from the electronic control unit.

The motor section 9 includes the motor 61 and the resolver 62 used as a rotation angle sensor to detect the rotation angle θ of the motor 61. The motor 61 is a permanent magnet three-phase synchronous motor.

The inverter 7 also has a function to convert in reverse the power generated by the motor 61 into a DC voltage and output the DC voltage to the booster circuit 5. The booster circuit 5 also has a function to charge the battery 3 by lowering the DC voltage inputted from the inverter 7 and outputting the lowered DC voltage to the battery 3. Description of these functions will, however, not be described.

The boost control section 10 included in the booster circuit 5 will be described in more detail below with reference to FIG. 3.

Figure 3:
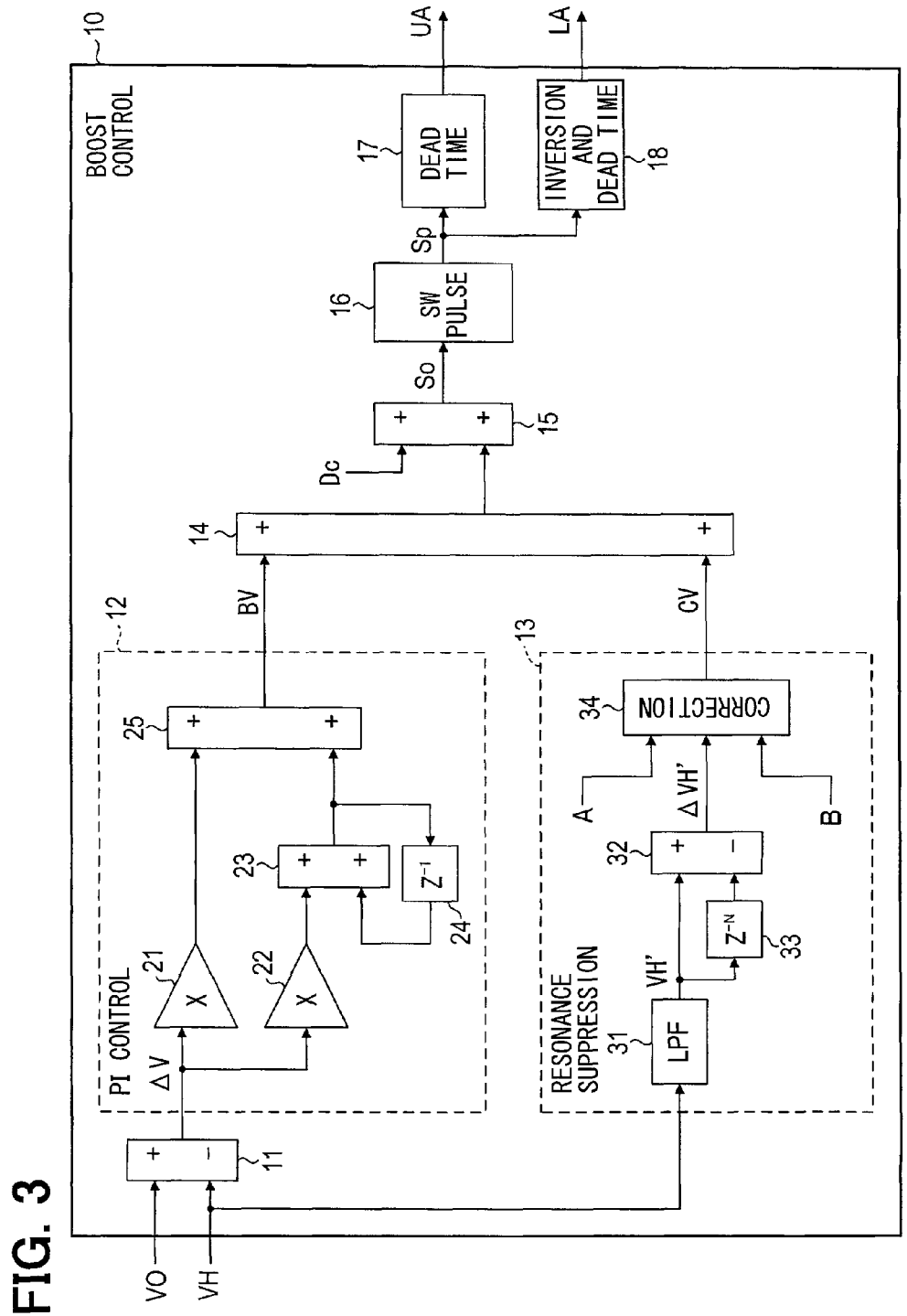
FIG. 3 is a circuit diagram showing a boost control section according to a first embodiment.

As shown in FIG. 3, the boost control section 10 includes: a subtractor 11 for calculating a target deviation ΔV which is the difference between the target voltage VO and the drive voltage VH; a PI control section 12 which calculates a basic command value BV for determining the on-duty ratio of the arm switches Tr1 and Tr2; a resonance suppression section 13 which calculates a correction value CV for correcting the basic command value BV outputted from the PI control section 12; a corrected command calculation section 14 which corrects the basic command value BV received from the PI control section 12 by adding the basic command value BV and the correction value CV received from the resonance suppression section 13 and outputs the resultant corrected command value; a control command calculation unit 15 which calculates a control command value So by adding a predetermined duty constant to the corrected command value; a switching pulse generation section 16 which generates a switching (SW) pulse signal Sp based on the control command value So; a dead time processing section 17 which generates an upper arm control signal UA based on the switching pulse signal Sp; and an inversion and dead time processing section 18 which generates a lower arm control signal LA based on the switching pulse signal Sp.

The PI control section 12 calculates, by performing proportional-integral control (PI control), the basic command value BV based on the target deviation ΔV so as to make the target deviation ΔV 0, i.e., so as to equalize the drive voltage VH and the target voltage VO.

Specifically, the PI control section 12 includes: a first multiplier 21 which calculates a proportional value by multiplying the target deviation ΔV by a predetermined proportional gain; a second multiplier 22 which multiplies the target deviation ΔV by a predetermined gain; an adder 23 for integration which calculates and outputs the integrated value of output of the second multiplier 22 at calculation timing in every control period, and a PI adder 25 which calculates a basic command value BV by adding the proportional value and the integrated value.

The integrated value outputted from the adder 23 for integration is inputted to the adder 23 for integration again after being delayed by one control period by a delay unit 24 for integration. That is, the adder 23 for integration is configured to perform integration, at every control period, by adding the value inputted from the second multiplier 22 at the present calculation timing to the integrated value calculated at the previous calculation timing.

The basic command value BV calculated in the PI control section 12 determines the on-duty ratio of the lower arm control signal LA to be eventually outputted. That is, based on the assumption that the correction value CV from the resonance suppression section 13 is 0, when the basic command value BV is larger, the on-duty ratio of the lower arm control signal LA is larger (causing the on-duty ratio of the upper arm control signal UA to be smaller) and the boost ratio is larger.

The resonance suppression section 13 is provided to suppress the variation of the drive voltage VH outputted from the converter 6 (particularly, the variation component in the vicinity of the resonance frequency f of the LC resonance circuit). It calculates, based on the state of variation of the drive voltage VH, the correction value CV for correcting the basic command value BV so as to suppress the variation of the drive voltage VH. Its configuration and operation will be described in detail later.

The corrected command calculation section 14 outputs, when the correction value CV from the resonance suppression section 13 is 0, the basic command value BV received from the PI control section 12 as it is or, when the correction value CV from the resonance suppression section 13 is a correction constant B (or −B) which is not 0, the sum of the basic command value BV and the correction constant B (or −B) as the correction command value.

The control command calculation unit 15 calculates the control command value So by adding a duty constant Dc to the correction command value. The duty constant Dc is calculated based on, for example, the target voltage VO and battery voltage VL. In the first embodiment, a predetermined constant value Dc is used. That is, a certain portion of the control command value So that finalizes the on-duty ratio of each of the control signals LA and UA is fixed in advance as the duty constant Dc. The remaining portion, i.e., the portion excluding the duty constant Dc, of the control command value So is calculated as the correction command value based on the real value (actual value) of the drive voltage VH and the state of variation of the drive voltage VH.

The duty constant Dc, however, need not necessarily be set in advance. For example, a basic command value BV inclusive of the portion to be accounted for by a duty constant may be calculated by the PI control section 12. In such a case, the correction command value from the corrected command calculation section 14 may be inputted as it is as a control command value So to the switching pulse generation section 16.

However, making the PI control section 12 calculate the basic command value BV including the portion to be accounted for by the duty constant increases the processing burden on the PI control section 12 while making it necessary to calculate a larger basic command value BV. This possibly decreases control trackability. To avoid such a disadvantage, a duty constant is set like a feedforward value to account for approximately a half or larger portion of the total control command value So. In this way, the PI control section 12 is to calculate a command value corresponding to the portion excluding the duty constant portion of the total control command value So. This reduces the processing burden on the PI control section 12 and improves control trackability.

Figure 4A:
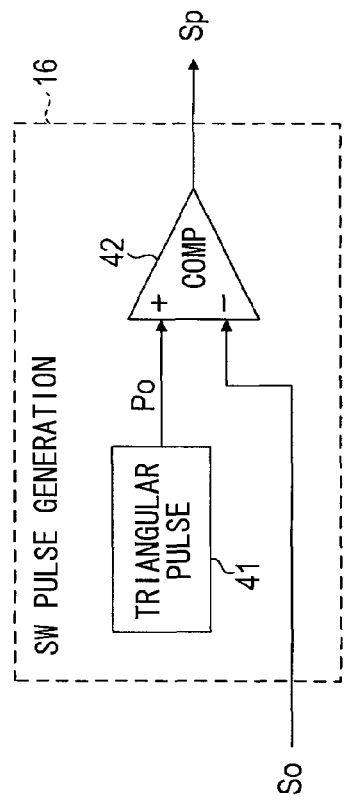
FIGS. 4A to 4C are a circuit diagram showing a switching pulse generation section in the first embodiment and are signal diagrams showing operations of the pulse generation section, respectively.

The switching pulse generation section 16 includes, as shown in FIG. 4A, a triangular pulse generation section 41 which generates a triangular pulse signal (of a predetermined frequency) Po and a comparator 42 which compares the triangular pulse signal Po with the control command value So and outputs the switching pulse signal Sp as a comparison result.

Figure 4C:
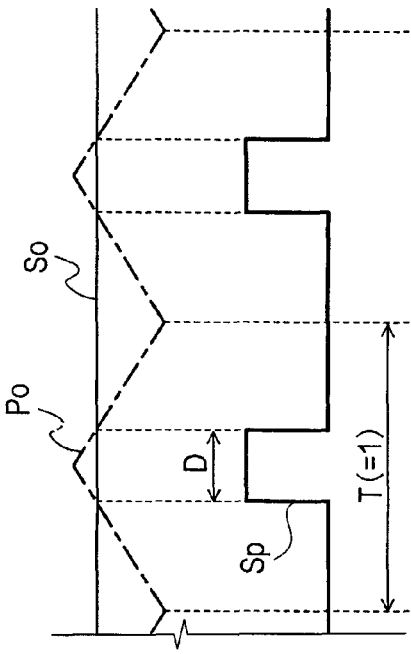
Figure 4B:
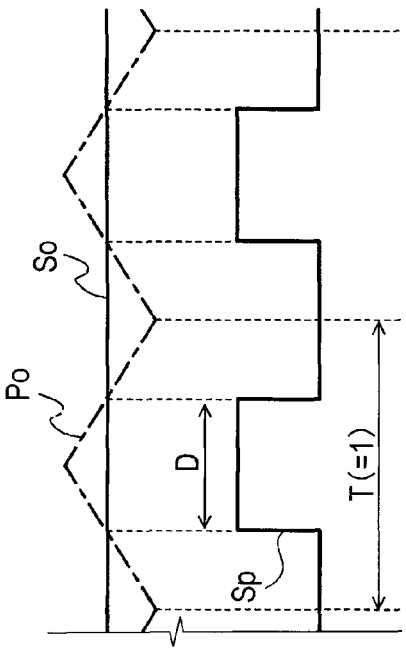

The triangular pulse signal Po and the control command value So are related as shown in FIGS. 4B and 4C. That is, the control command value So stays within the amplitude of the triangular pulse signal Po. The comparator 42 outputs the switching pulse signal Sp whose level is high when the value of the triangular pulse signal Po is equal to or larger than the control command value So or low when the value of the triangular pulse signal Po is smaller than the control command value So.

It is assumed here that a period T of one cycle of the triangular pulse signal Po is 1 and a time period during which the switching pulse signal Sp is high (at H level) within the period T is represented by D. When, for example, the basic command value BV becomes larger causing the control command value So to be larger, the H-level period D during which the switching pulse signal Sp is at H level within the period T (=1) becomes shorter. Referring to FIGS. 4B and 4C, the control command value So is larger in FIG. 4C than in FIG. 4B. As clearly shown in FIGS. 4B and 4C, the H level period D of the switching pulse signal Sp is shorter when the control command value So is larger.

When the H level period D is shorter (i.e. the control command value So is larger), the on-duty ratio of the lower arm control signal LA to be eventually outputted is larger and the on-duty ratio of the upper arm control signal UA to be eventually outputted is smaller, resulting in a higher boost ratio.

Hence, when the correction value CV outputted from the resonance suppression section 13 is positive (correction constant B), the control command value So becomes larger than when the correction value CV is 0, resulting in a higher boost ratio. Conversely, when the correction value CV outputted from the resonance suppression section 13 is negative (correction constant −B), the control command value So becomes smaller than when the correction value CV is 0, resulting in a lower boost ratio. Thus, an increase, caused by a positive correction value CV, in the control command value So from the state shown in FIG. 4B to the state shown in FIG. 4C section that a correction is effected in the boosting direction.

Figure 5A:
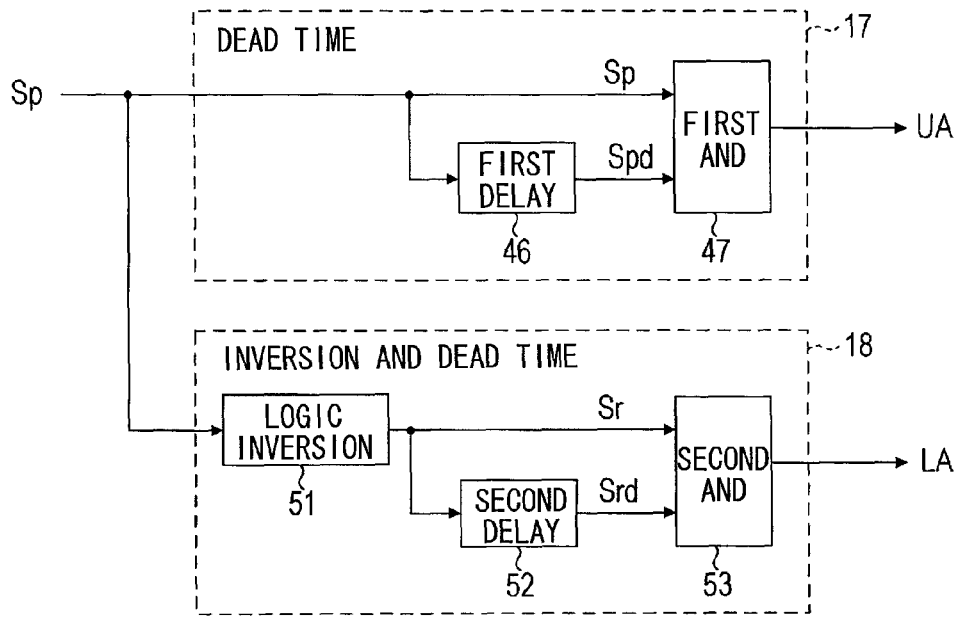
FIGS. 5A and 5B are a circuit diagram showing a dead time processing section and an inversion and dead time processing section in the first embodiment and a signal diagram showing its operation, respectively.

The dead time processing section 17 includes, as shown in FIG. 5A, a first delay section 46 which delays the switching pulse signal Sp by a predetermined dead time and outputs a resultant delayed pulse signal Spd and a first AND circuit 47 which calculates the logical product of the switching pulse signal Sp and the delayed pulse signal Spd and outputs the resultant upper arm control signal UA.

Figure 5B:
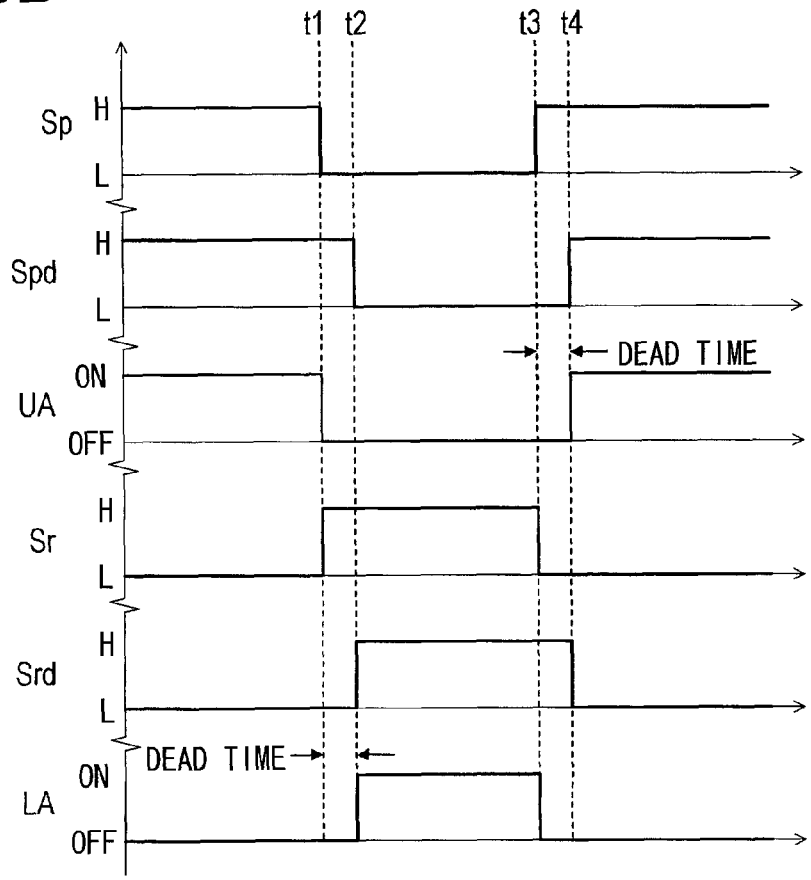

The relations between the switching pulse signal Sp and the delayed pulse signal Spd and upper arm control signal UA are shown in an upper half part of FIG. 5B. The upper arm control signal UA is a pulse signal which rises later than the switching pulse signal Sp by the dead time.

The inversion and dead time processing section 18 includes, as shown in FIG. 5A, a logic inversion section 51 which inverts the logic of the switching pulse signal Sp and outputs the inverted pulse signal Sr, a second delay section 52 which delays the inverted pulse signal Sr by a predetermined dead time and outputs the delayed inverted pulse signal Srd and a second AND circuit 53 which calculates the logical product of the inverted pulse signal Sr and the delayed inverted pulse signal Srd and outputs a resultant lower arm control signal LA.

Relations between the switching pulse signal Sp and the inverted pulse signal Sr are shown in FIG. 5B. The delayed inverted pulse signal Srd and the lower arm control signal LA are shown in the lower half part of FIG. 5B. The lower arm control signal LA is a pulse signal which rises after the inverted pulse signal Sr generated by inverting the logic of the switching pulse signal Sp. This delay is the dead time.

Comparing the upper arm control signal UA and the lower arm control signal LA, they are related such that both of them stay at L level for a time period equaling the dead time between when one of them falls to L level and when the other of them rises to H level.

Thus, the upper and the lower arm control signals UA and LA are generated involving dead time processing. It is to prevent the upper and the lower arm control signals UA and LA from simultaneously rising to H level (causing the arm switches Tr1 and Tr2 to turn simultaneously on). For the first and second delay sections 46 and 52, the delay amounts may be appropriately set.

In the booster circuit 5 configured as described above, when the correction value CV from the resonance suppression section 13 is 0, the boost ratio (conversion ratio) is dependent on the basic command value BV. That is, as described with reference to FIGS. 4B and 4C, the larger the basic command value BV, the larger the control command value So and the smaller the H-level period D of the switching pulse signal Sp. It is note that the H-level period D is, as described above, based on the period T (=1) of the triangular pulse signal Po and represents the ratio with respect to the period T of the triangular pulse signal Po.

When the H-level period D of the switching pulse signal SP is shorter, the H-level period of the upper arm control signal UA becomes smaller (i.e., the on-duty ratio of the upper arm switch Tr2 becomes smaller) and the H-level period of the lower arm control signal LA becomes longer (i.e., the on-duty ratio of the lower arm switch Tr1 becomes larger) resulting in a larger boost ratio. The relation between the H-level period D of the switching pulse signal Sp and the boost ratio is represented by the following equation (3) with the dead time ignored for simplification.

$$VH/VL = 1/D \qquad (3)$$

In the motor drive system 1 mounted in an electric vehicle, periodic variation (mainly first-order variation occurring in synchronization with the electrical angular period of the motor) of the torque of the motor 61 is caused by various factors as described above. This causes the motor power to vary and the motor power variation causes the drive voltage VH outputted from the booster circuit 5 to vary. Since the frequency of torque variation changes according to the rotation speed of the motor 61, the frequency of variation of the drive voltage VH also changes according to the rotation speed of the motor 61.

The converter 6 included in the booster circuit 5 includes, as described above, an LC resonance circuit. Therefore, if the frequency of variation of the drive voltage VH coincides with the resonance frequency f of the LC resonance circuit, the resultant resonance phenomenon magnifies the amplitude of variation of the drive voltage VH.

Therefore, the boost control section 10 for the converter 6 is configured to be capable of suppressing variation of the drive voltage VH, the voltage amplitude variation width at the resonance frequency f, in particular. More specifically, the boost control section 10 has the resonance suppression section 13, in addition to the PI control section 12, for correcting the basic command value BV from the PI control section 12.

As shown in FIG. 3, the resonance control section 13 includes a low-pass filter (LPF) 31 and a delay unit 33 for difference calculation. The LPF 31 removes frequency components higher than a predetermined frequency band (resonance frequency band) inclusive of the resonance frequency f from the drive voltage VH. The delay unit 33 for difference calculation samples (collects), at sampling timing in every sampling period Ts, the drive voltage VH (filtered voltage VH') having had the frequency components higher than the resonance frequency band removed by the LPF 31 while outputting a filtered voltage VH' sampled N sampling periods Ts (i.e., N·Ts) ago. Furthermore, the resonance suppression section 13 includes a difference calculation section 32 which samples, at every sampling timing, the filtered voltage VH' having passed the LPF 31, calculates the difference between the VH' thus sampled and the filtered voltage VH' outputted from the delay unit for difference calculation 33 (i.e., the filtered voltage VH' sampled N periods before the filtered voltage VH' just sampled) and outputs the calculated difference value.

"N" is assumed to be 1. That is, at every sampling timing, the delay unit 33 for difference calculation outputs the filtered voltage VH' sampled one sampling period Ts ago. Hence, the difference calculation section 32 calculates, at every sampling timing, the difference between the filtered voltage VH' sampled at each sampling timing and the filtered voltage VH' sampled at the previous sampling timing. The assumption of N=1 is only an example and N may be set to 2 or larger value. This difference is indicated as ΔVH' which corresponds to ΔVH.

The difference calculation section 32 and the delay unit 33 for difference calculation both receive, via the LPF 31, the drive voltage VH outputted from the converter 6 at every sampling period Ts, so that they may have a function as a voltage detection section.

The difference-calculation time difference Td representing the difference between when one of the two filtered voltages VH' to be the targets of difference calculation is sampled and when the other of the two filtered voltages VH' is sampled can be set appropriately. The difference-calculation time difference Td corresponds to the detection time difference. N is set to 1, so that difference-calculation time difference Td becomes the sampling period Ts. The difference-calculation time difference Td is set to be about 1/16 of the resonance period corresponding to the resonance frequency f so as to accurately determine the state of variation of the drive voltage VH at the resonance frequency f. That is, the rate of variation of the drive voltage VH (to be precise, the rate of variation of the filtered voltage VH') during 1/16 of the resonance period is calculated.

When the difference-calculation time difference Td is too long, difference detection reliability may be impaired. To accurately determine the state of variation of the drive voltage VH in the resonance frequency band, in particular, it is necessary to pay attention to the relationship between the resonance period and the difference-calculation time difference Td. The difference-calculation time difference Td is preferable not to exceed ½ of the resonance period according to the sampling theorem. However, when the difference-calculation time difference Td is too short, effects not related with resonance, for example, noise may possibly be detected as variation to be corrected. In such a case, it may not be possible to accurately and adequately detect a voltage difference, and the processing load may unnecessarily increase.

The difference-calculation time difference Td is set to $1/16$ of the resonance period. Calculating the difference between two filtered voltages VH' sampled at different times, which are apart by time difference Td equal to $1/16$ of the resonance period, makes it possible to acquire an adequately reliable difference value involving a less processing load. That is, out of the variation of the drive voltage VH, the state of variation (variation amplitude) of the frequency component in the resonance frequency band can be accurately determined.

The resonance suppression section 13 further includes a correction section 34 which calculates the correction value CV based on the difference value ($\Delta$VH' corresponding to $\Delta$VH) calculated by the difference calculation section 32. The correction section 34 receives, besides the difference value inputted from the difference calculation section 32, a predetermined difference threshold value A and a correction constant B (both are positive constants).

Figure 6:
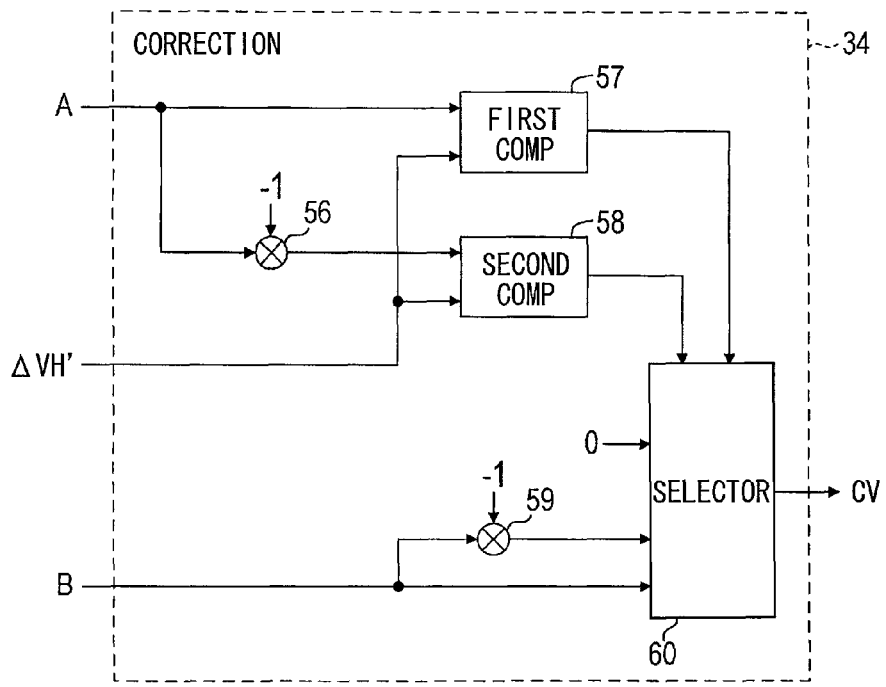
FIG. 6 is a circuit diagram showing a correction section in the first embodiment.

As shown in FIG. 6, the correction section 34 includes a first comparison section 57 which compares the difference threshold value A and the difference value, a first multiplier 56 which calculates a negative difference threshold value –A by multiplying the difference threshold value A by –1, a second comparison section 58 which compares the negative difference threshold value –A outputted from the first multiplier 56 and the difference value, a second multiplier 59 which calculates a negative correction constant –B by multiplying the correction constant B by –1, and a selector 60 which, based on the results of comparison made by the first comparison section 57 and the second comparison section 58, selects and outputs one of 0, the correction constant B and the negative correction constant –B as the correction value CV.

Figure 7:
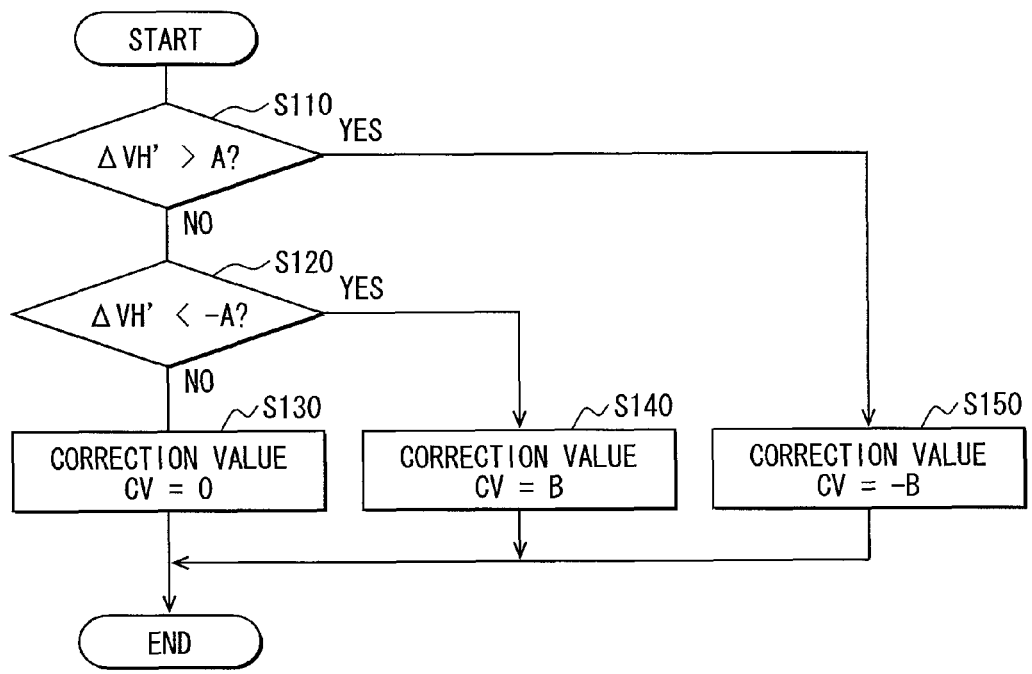
FIG. 7 is a flowchart showing an operation of a selector included in the correction section.

The correction section 34 operates as shown by the flowchart of FIG. 7. First, it is checked whether the difference value is larger than the difference threshold value A by the first comparison section 57 (S110). When the difference value is larger than the difference threshold value A, the negative correction constant –B is set as the correction value CV by the selector 60 (S150). The difference value larger than the difference threshold value A indicates that the drive voltage VH is varying in the rising direction, so that it is necessary to make the control command value So smaller in order to suppress the rising tendency of the drive voltage VH and to make the absolute value of the difference value smaller (to make the difference approach 0). Hence, using the negative correction constant –B as the correction value CV makes the basic command value BV from the PI control section 12 smaller (corrected to be smaller by the correction constant B) resulting in suppressing the rise of the drive voltage VH.

When, on the other hand, the difference value is not larger than the difference threshold value A, it is checked whether the difference value is smaller than the negative difference threshold value –A by the second comparison section 58 (S120). When the difference value is smaller than the negative difference threshold value –A, the positive correction constant B is set as the correction value CV at the selector 60 (S140). The difference value smaller than the negative difference threshold value –A indicates that the drive voltage VH is varying in the lowering direction, so that it is necessary to make the control command value So larger in order to suppress the lowering tendency of the drive voltage VH and make the absolute value of the difference value smaller (to make the difference approach 0). Hence, using the positive correction constant B as the correction value CV makes the basic command value BV from the PI control section 12 larger (made larger by the correction constant B) resulting in suppressing the lowering of the drive voltage VH.

When the difference value is not smaller than the negative difference threshold value –A, either the drive voltage VH is not varying in the resonance frequency band or its variation in the resonance frequency band is not so large as to require correction, so that the correction value CV is set to 0 at the selector 60 (S130). That is, in this case, the basic command value BV from the PI control section 12 is inputted as it is to the control command calculation unit 15. The operation of the correction section 34 may be realized by either software or hardware.

Even though the difference threshold value A may be determined appropriately, it is advisable, in cases where the electrical angular frequency of the motor 61 is lower than the resonance frequency band, to determine the difference threshold value A such that the absolute value of the difference value does not exceed the difference threshold value A. In this way, it can be determined whether to correct the basic command value BV focusing on drive voltage variation in the resonance frequency band only.

The correction constant B may also be determined appropriately. Since, however, the correction constant B is a supplementary correction value CV for correcting the basic command value BV from the PI control section 12, it is preferably set to be small relative to the basic command value BV. When the correction constant B is set to be too large, it may become a disturbance to make control unstable. When the correction constant B is too small, it may not generate a required correction effect, i.e., its suppression effect against variation of the drive voltage VH in the resonance frequency band will become inadequate.

It is therefore preferable to set the correction constant B to a value approximately equivalent to $1/10$ of the on-duty ratio of the lower arm switch Tr1 required to achieve the target boosting level. With the duty constant set, as an example, to account for approximately a half or larger portion of the control command value So, the correction constant B is set to be $1/10$ of the duty constant.

As described above, in the motor drive system 1 of the first embodiment, unlike in the conventional systems where merely a control signal dependent on the basic command value BV from the PI control section 12 is outputted to the converter 6, the state of variation of the drive voltage VH actually outputted from the converter 6 is detected and the basic command value BV is corrected in the direction to suppress the variation. To be specific, the resonance suppression section 13 for calculating the correction value CV based on the state of variation of the drive voltage VH (the state of variation in the resonance frequency band, in particular) is provided separately from and additionally to the PI control section 12, and the basic command value BV is corrected using the correction value CV calculated by the resonance suppression control section 13. Then, the control signals UA and LA based on the control command value So that is based on the corrected basic command value BV (corrected command value) are generated and outputted to the converter 6.

Hence, it is possible to suppress the variation, caused by torque variation of the motor 61, of the drive voltage VH for the converter 6. Particularly, in the first embodiment, the converter 6 that is the target of control has the LC resonance circuit with the motor 61 on the load side (load with periodic torque variation). When the frequency of torque variation and the resonance frequency f of the LC resonance circuit happen to coincide, the torque variation may increase. Such an increase in torque variation can be effectively suppressed as described above.

Also, in the first embodiment, in detecting the state of variation of the drive voltage VH, the difference between the drive voltages VH sampled at different times is calculated. It is further checked whether the current drive voltage VH requires correction depending on whether the difference value is larger than the difference threshold value A. More specifically, it is checked whether the difference value is larger than the positive difference threshold value A or whether the difference value is smaller than the negative threshold value −A. When the absolute value of the difference value is larger than the difference threshold value A, the drive voltage is corrected.

Thus, the state of variation of the drive voltage VH can be detected using a simple configuration in which the difference value is calculated and an appropriate correction value CV based on the difference value can be calculated. This makes it possible to appropriately suppress variation of the drive voltage VH using a simple configuration. When the absolute value of the difference value is not larger than the difference threshold value A, no correction is performed. This makes it possible to avoid undesired, excessive correction and perform required correction efficiently.

Also, in the first embodiment, either the positive correction constant B or the negative correction constant −B is set as the correction value CV, so that the correction value CV can be calculated and set in a simple manner.

Furthermore, in the first embodiment: the difference threshold value A is set to such a value that, when the electrical angular frequency of the motor 61 is lower than the resonance frequency band of the LC resonance circuit, the absolute value of the difference value does not exceed the difference threshold value A; the difference-calculation time difference Td is set to 1/16 of the resonance period; and the LPF 31 is provided in the input stage of the resonance suppression section 13.

When the frequency of variation of the drive voltage VH coincides with the resonance frequency f causing the drive voltage VH to largely vary (resonance), the basic command value BV is corrected, i.e., each portion per detection period of the drive voltage VH where the difference value exceeds the difference threshold value A is regarded as the correction section as shown in FIG. 8A and the basic command value BV for the correction section is corrected. As a result, large variation of the drive voltage VH attributable to the resonance can be suppressed.

When the variation frequency of the drive voltage VH is outside the resonance frequency band, the difference value stays smaller than the difference threshold value A, so that no correction is performed. That is, when the rotation speed of the motor 61 is low and the electrical angular frequency of the motor 61 is lower than the resonance frequency band, the variation period of the drive voltage VH is long making, as shown in FIG. 8B, the difference between voltages detected at two consecutive detection times small not to exceed the difference threshold value A. In this case, no correction is performed. When the rotation speed of the motor 61 is high and the electrical angular frequency of the motor 61 is higher than the resonance frequency band, the amplitude of the high frequency component is attenuated, as shown in FIG. 8C, by the LPF 31 provided in the resonance suppression section 13, causing the difference value to be smaller than the difference threshold value A. In this case, too, no correction is performed.

As described above, no correction takes place outside the resonance frequency band. In this way, it is possible to detect a reliable difference value under a reduced processing load and perform highly reliable correction calculation to adequately meet requirement.

In the first embodiment: the PI control section 12 corresponds to the basic command value calculation section; the difference calculation section 32 corresponds to the difference calculation section; the LPF 31 corresponds to the filter section; and the sampling period Ts corresponds to the detection period.

Second Embodiment

Figure 9:
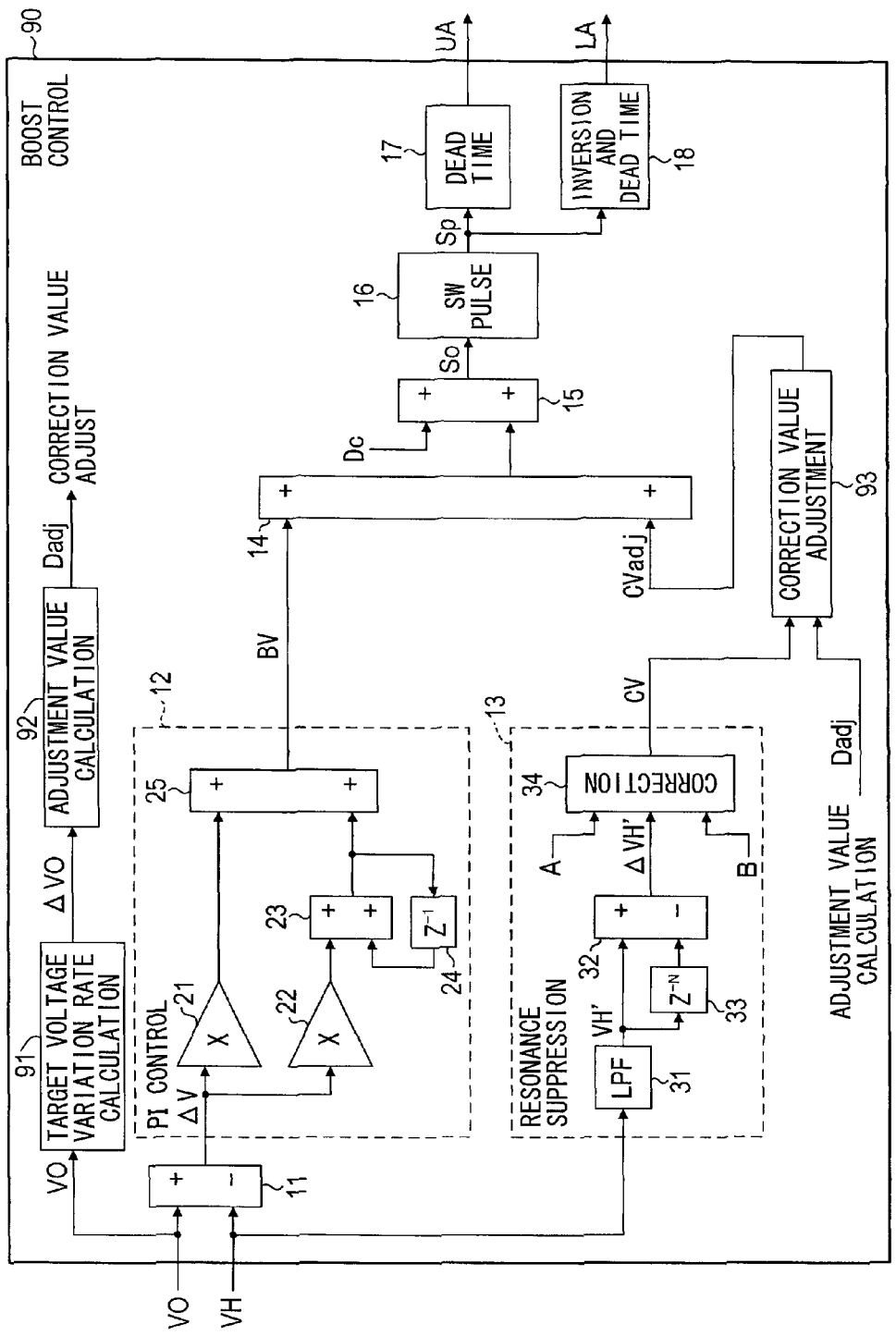
FIG. 9 is a circuit diagram showing a boost control section according to a second embodiment.

A second embodiment will be described below with reference to FIGS. 9 to 12. As shown in FIG. 9, the second embodiment differs from the first embodiment in the configuration of a boost control section 90. The boost control section 90 is additionally provided with a target voltage variation rate calculation section 91, an adjustment amount calculation section 92 and a correction value adjustment section 93 which are not included in the boost control section 10 of the first embodiment.

Figure 10:
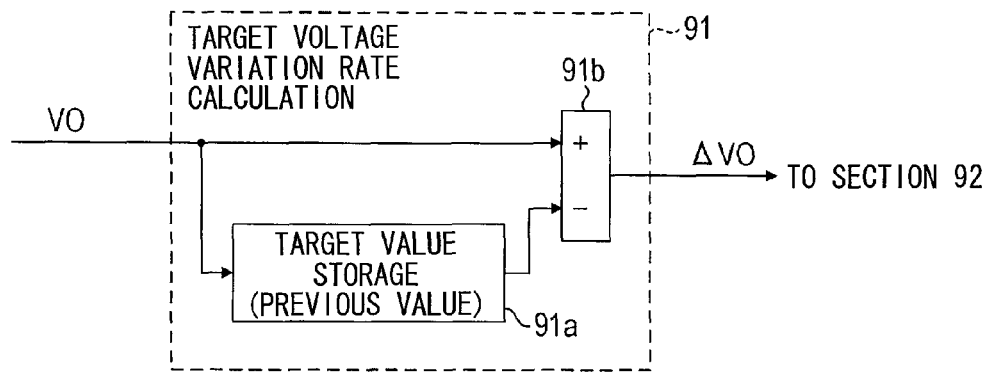
FIG. 10 is a circuit diagram showing a target voltage variation rate calculation section in the second embodiment.

In the target voltage variation calculation section 91 shown in FIG. 10, every time the boost control section 90 receives the target voltage VO from the electronic control device, a target value storage section 91a outputs the previous value (VO_old) that is the previously received target voltage VO, then a variation rate calculation section 91b calculates, on a continual basis, the difference between the previous value and the last (latest) value, i.e., the last received target voltage VO, (last value−previous value) and calculates the variation rate ΔVO of the target voltage VO by dividing the above difference by the difference reception period. An arrangement may be made such that, instead of having the difference between the previous target voltage VO and the last target voltage VO continually calculated by the target voltage variation rate calculation section 91, the variation rate of the target voltage VO is determined beforehand. That is, in setting the target voltage VO according to the operating state of the motor 61, the target voltage VO may be set based on a predetermined variation rate or one of plural predetermined variation rates, causing the selected variation rate to be outputted (inputted to the adjustment amount calculation section 92).

Generally, in feedback control, overshooting and undershooting occur. Taking into consideration such overshooting and undershooting, the adjustment amount calculation section 92 shown in FIG. 11 calculates, depending on the variation rate ΔVO of the target voltage VO, the adjustment amount Dadj based on the design gain and the deviation between the target voltage VO and the drive voltage VH. The adjustment amount Dadj may be determined, like the example shown in FIG. 11, as follows. When the variation rate ΔVO is in a region RA including the ratio-0 point, the adjustment amount Dadj is set to 0. When the variation rate ΔVO is in a predetermined region RB1 where the variation rate ΔVO is larger than in the region RA, the adjustment amount Dadj proportional to ΔVO is outputted. When the variation rate ΔVO is in a region RC1 where the variation rate ΔVO is larger than in the region RB1, the adjustment amount Dadj is kept unchanged from its level for the point where the variation rate ΔVO is largest in the region B1. When the variation rate ΔVO is in a predetermined region RD1 where the variation rate is larger than in the region RC1, the adjustment amount Dadj is set to 0. Similarly, when the variation rate ΔVO is in a predetermined region RB2 where the variation rate ΔVO is smaller than in the region RA, the adjustment amount Dadj proportional to ΔVO is outputted. When the variation rate ΔVO is in a predetermined region RC2 where the variation rate ΔVO is smaller than in the region RB2, the adjustment amount Dadj is kept unchanged from its level for the point where the variation rate ΔVO is lowest in the region RB2. When the variation rate ΔVO is smaller than in a predetermined region RC2, the adjustment amount Dadj is set to 0. The relationship between the variation rate ΔVO and the adjustment amount Dadj may be stored as a data map in a memory (not shown).

Generally, the responsiveness of feedback control is determined by the proportional gain and integration gain of the PI control section 12. Therefore, when the variation rate ΔVO of the target voltage VO is positive, overshooting becomes larger corresponding to the variation rate ΔVO, so that, as in the regions RB1 and RC1, the positive adjustment amount Dadj appropriate for the variation rate ΔVO is calculated by the adjustment amount calculation section 92. When, on the other hand, the variation rate ΔVO of the target voltage VO is negative, the negative adjustment amount Dadj is calculated, as in the regions RB2 and RC2, by the adjustment amount calculation section 92 by taking undershooting into consideration.

Figure 12:
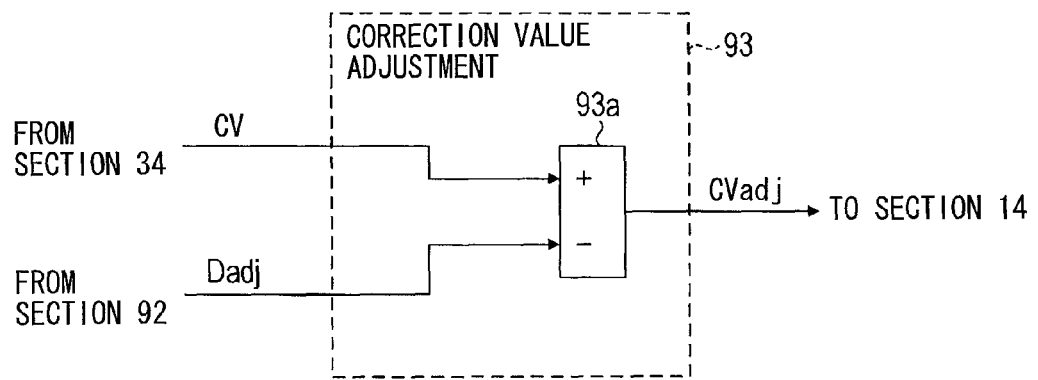
FIG. 12 is a circuit diagram showing a correction amount adjustment section in the second embodiment.

Then, in the correction value adjustment section 93 shown in FIG. 12, a calculation unit 93a adjusts the correction value CV outputted from the correction section 34 by subtracting the adjustment amount Dadj calculated by the adjustment amount calculation section 92 from the correction value CV as shown in FIG. 12. In this way, even with the target voltage VO varying, a more reliable correction value CV attributable to resonance, from which the effect of target voltage variation has been removed, can be calculated. Thus, an adjusted correction value CVadj obtained by having the correction value CV from the correction section 34 adjusted by the correction value adjustment section 93 is inputted to the corrected command calculation section 14.

Third Embodiment

A third embodiment will be described below with reference to FIGS. 13 and 14.

In the third embodiment, the target voltage variation rate calculation section 91 and the correction value adjustment section 93 used in the second embodiment are configured differently.

Figure 13:
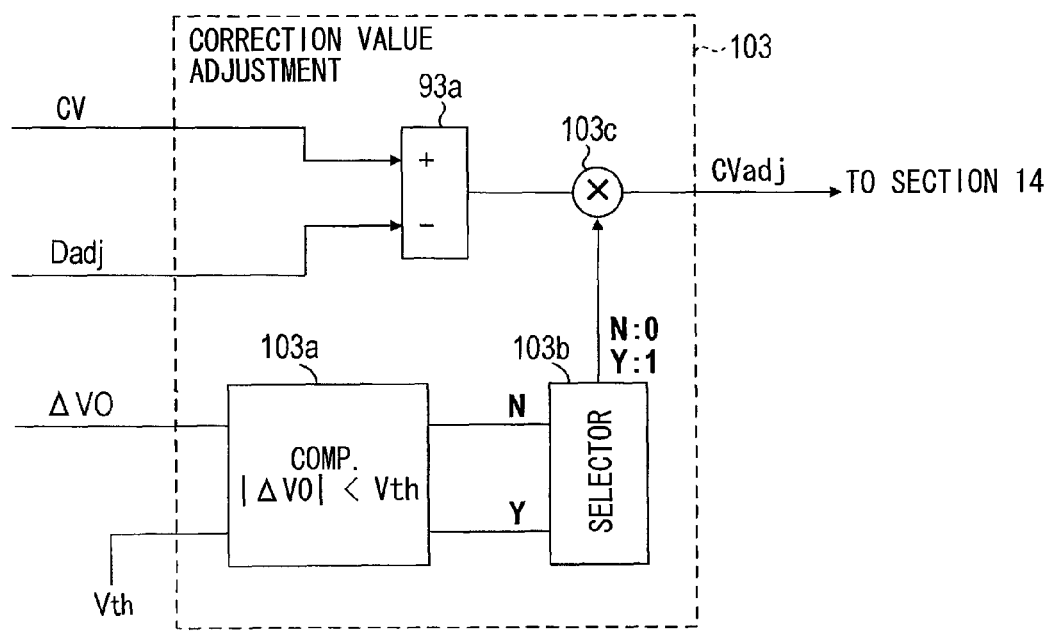
FIG. 13 is a circuit diagram showing a correction amount adjustment section according to a third embodiment.
Figure 14:
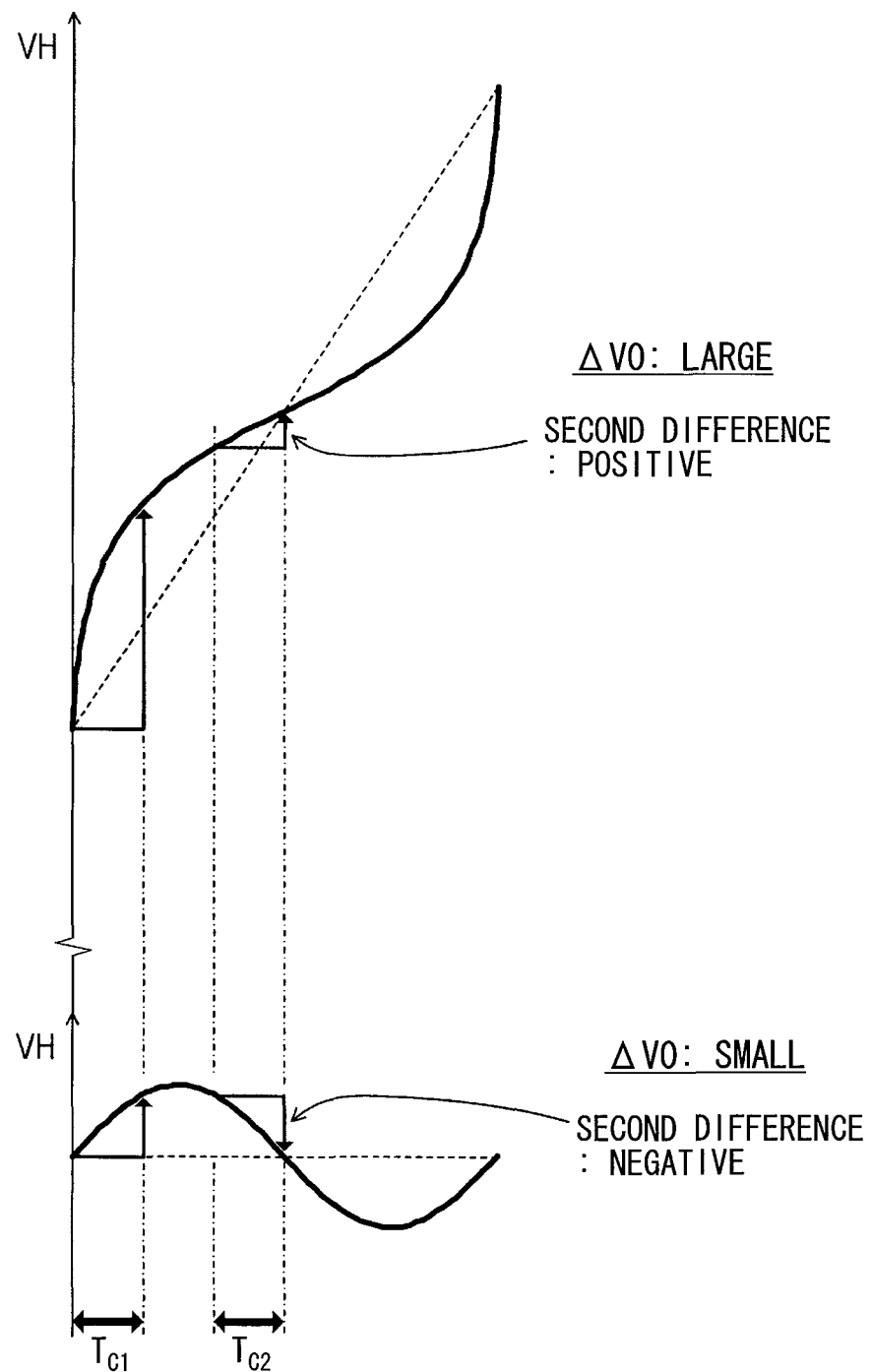
FIG. 14 is a signal diagram showing a relation between the magnitude of variation rate ΔVO of a target voltage and the difference value of a drive voltage VH in the third embodiment.

That is, unlike in the second embodiment in which the correction value CV is adjusted by the correction value adjustment section 93 configured as shown in FIG. 12, the correction value CV is adjusted by a correction value adjustment section 103 shown in FIG. 13. Also, the target voltage variation rate calculation section 91 outputs the calculated variation rate ΔVO to the correction value adjustment section 103 in addition to the adjustment amount calculation section 92.

As shown in FIG. 13, the correction value adjustment section 103 compares, at a comparison section 103a, the variation rate ΔVO and a threshold value Vth to check whether the absolute value of the variation rate ΔVO is smaller than the threshold value Vth. When the absolute value is smaller than the threshold value Vth, the correction value CV outputted from the subtractor 93a, i.e., the adjusted correction value CVadj obtained by subtracting the adjustment amount Dadj from the unadjusted correction value CV, is outputted to the corrected command calculation section 14. To be more specific, when the absolute value of the variation rate |ΔVO| is smaller than the threshold value Vth, the multiplier for use at a multiplier 103c is set to 1 by a selector 103b. This causes the correction value CV outputted from the subtractor 93a and multiplied by 1 by the multiplier 103c (i.e., virtually, the adjusted correction value CVadj outputted from the subtractor 93a as it is) to be outputted. When, on the other hand, the absolute value of the variation rate |ΔVO| is not smaller than the threshold value Vth, the multiplier is set to 0 by the selector 103b. This causes the correction value CV to be outputted to the corrected command calculation section 14 to be set to 0 not to affect the correction command value to be outputted from the corrected command calculation section 14 at all.

The advantageous effects of the third embodiment are as follows. When data such as the target voltage VO and variation rate ΔVO stored in the memory corrupts causing, for example, the variation rate ΔVO to be changed to an extremely large (or small) value, reliability of the difference value possibly decreases. Taking the resonant waveforms shown in FIG. 14, for example, even though their amplitudes are the same, the variation rate ΔVO of the target voltage VO differs between them. Even though they are identical in terms of frequency and amplitude, they differ regarding the difference value. That is, whereas the difference values are positive in both a first and a second correction periods Tc1 and Tc2 in case of a large variation rate ΔVO, the difference value is positive in the first correction section and negative in the second correction section in the example shown in FIG. 14.

Figure 11:
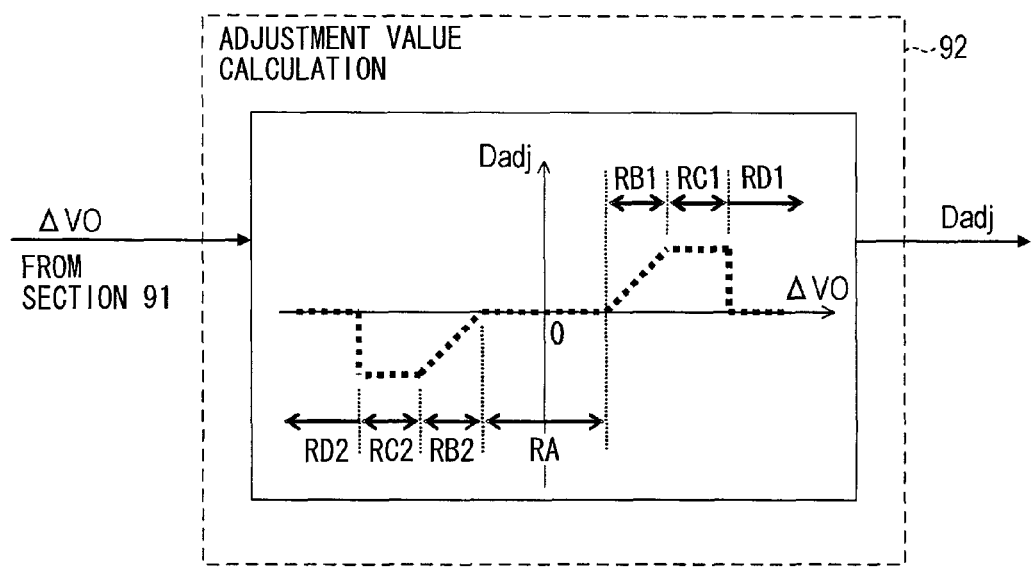
FIG. 11 is a circuit diagram showing an adjustment amount calculation section.

In cases where, the variation rate ΔVO is extremely large (for example, when the difference value is either positive or negative through a whole resonance period), the variation rate ΔVO is determined, by the adjustment amount calculation section 92, to fall in a predetermined range (i.e., falling in a region where the variation rate ΔVO is larger than in the region RC1 shown in FIG. 11 or where the variation rate ΔVO is smaller than in the region RC2 shown in FIG. 11), so that the adjustment amount is set to 0. Even though this causes the variation rate ΔVO not to affect the correction command value, the difference value calculated at the resonance suppression section 13 is affected by the extremely large variation rate ΔVO resulting in an extremely large (or small) correction value CV to be inputted to the corrected command calculation section 14.

In the second embodiment, when the absolute value of the variation rate ΔVO is not smaller than the threshold value Vth, the correction value CV is set to 0 so as not to allow the correction value CV to affect the corrected command calculation section 14.

Fourth Embodiment

A fourth embodiment will be described below with reference to FIGS. 15A to 15C through FIG. 20.

Figure 16:
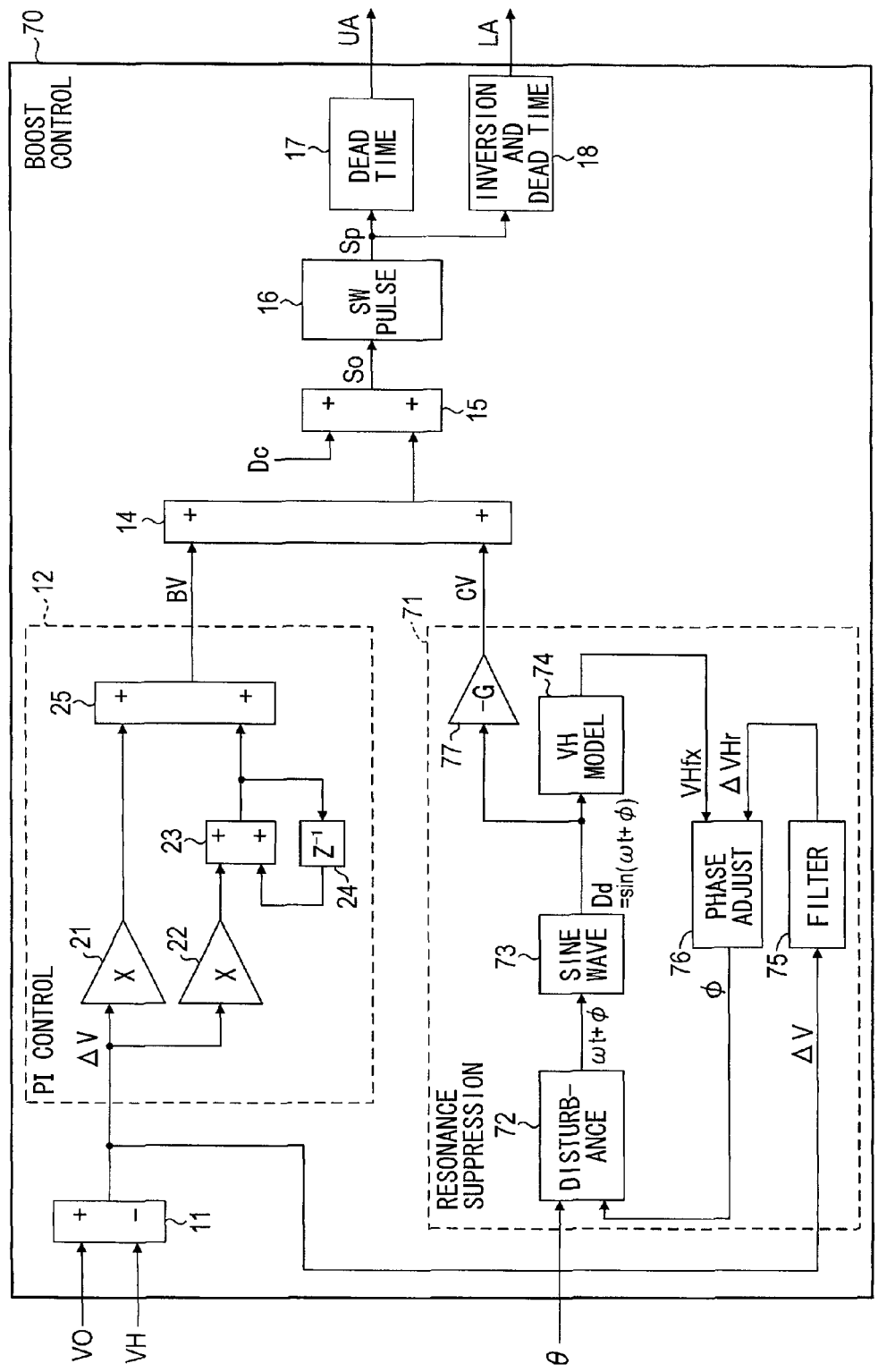
FIG. 16 is a circuit diagram showing the boost control section in the fourth embodiment.

In the fourth embodiment, the boost control section is configured differently from the first embodiment. More specifically, as comparison between the boost control section 70 shown in FIG. 16 and the boost control section 10 shown in FIG. 3 makes clear, a resonance suppression section 71 shown in FIG. 16 is configured differently from the resonance suppression section 13 shown in FIG. 3. The resonance suppression section 71 makes calculation using the rotation angle θ of the motor 61, so that the rotation angle θ from the resolver 62 is also inputted to the resonance suppression section 71. In other respects, the fourth embodiment is configured basically identically to the first embodiment. Hence, in the following, the functions and configuration of the resonance suppression section 71 will be described.

First, the theory of correction of the basic command value BV adopted in the boost control section 70 will be described with reference to FIGS. 15A to 15C.

In a vehicle, the variation (resonance) of the drive voltage VH is, in reality, attributable to disturbance caused by the motor 61. The disturbance is assumed to be generated at other than the motor 61.

Figure 15A:
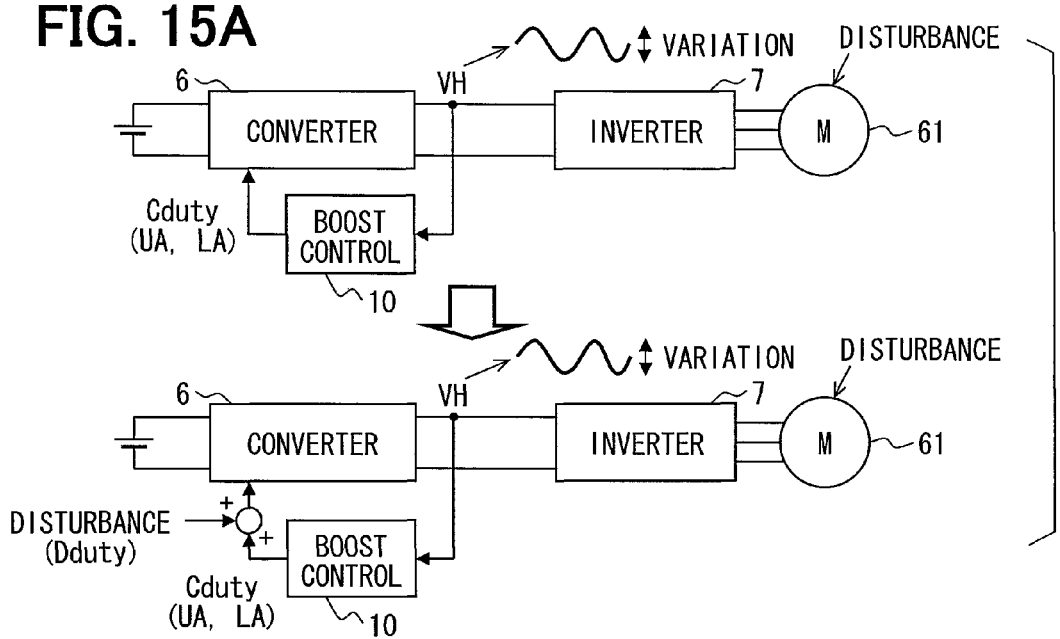
FIGS. 15A to 15C are explanatory diagrams showing a theory of operation (theory of correction) of a boost control section according to a fourth embodiment.

As shown in the upper half part of FIG. 15A, the resonance of the drive voltage VH is, as described above, attributable to periodic motor-torque variation making up disturbance. That is, as the motor torque periodically varies, the motor power periodically varies causing the drive voltage VH to vary. In this state, when the frequency of the first-order variation component, i.e., a main component, of the entire motor-torque variation component coincides with the resonance frequency f of the converter 6, the drive voltage VH resonates. Since the motor torque variation period depends on the rotation speed (to be specific, the electrical angular frequency ω) of the motor 61, the variation of the drive voltage VH may be assumed to occur in synchronization with the rotation speed (the electrical angular frequency ω) of the motor 61.

As described above, the variation (resonance) of the drive voltage VH is, in reality, attributable to disturbance caused by the motor 61 and occurs in synchronization with the rotation speed (electrical angular frequency ω) of the motor 61. However, it is considered that the disturbance, which causes the drive voltage VH to vary, is generated, as shown in the lower half part of FIG. 15A, at other than the motor 61. That is, based on the assumption that the motor 61 causes no disturbance with the motor power not varying, it is considered that the variation (resonance) of the drive voltage VH is caused by disturbance mixed with a duty signal (in reality, mixed with the control signals UA and LA dependent on the duty signal) representing a duty command value Cduty outputted, to determine a boost ratio, from the boost control section 10 serving as the control unit.

Figure 15B:
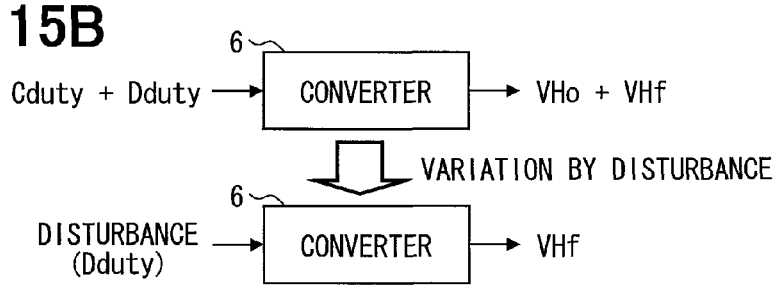

As shown in FIG. 15B, when the duty signal Cduty mixed with disturbance Dduty is inputted to the converter 6, the drive voltage VH outputted from the converter 6 becomes equal to the sum of a steady-state voltage VHo and a variation portion VHf. The variation portion VHf is the drive voltage portion attributable to the disturbance. That is, when the duty command signal inputted finally to the converter 6 is assumed to be an input duty to the converter 6, the input duty to the converter 6 is equal to the sum of the duty signal and a disturbance-attributable duty representing a duty portion attributable to the disturbance.

Therefore, when only the disturbance-attributable duty Dduty is inputted to the converter 6, only the variation portion VHf is outputted from the converter 6.

Figure 15C:
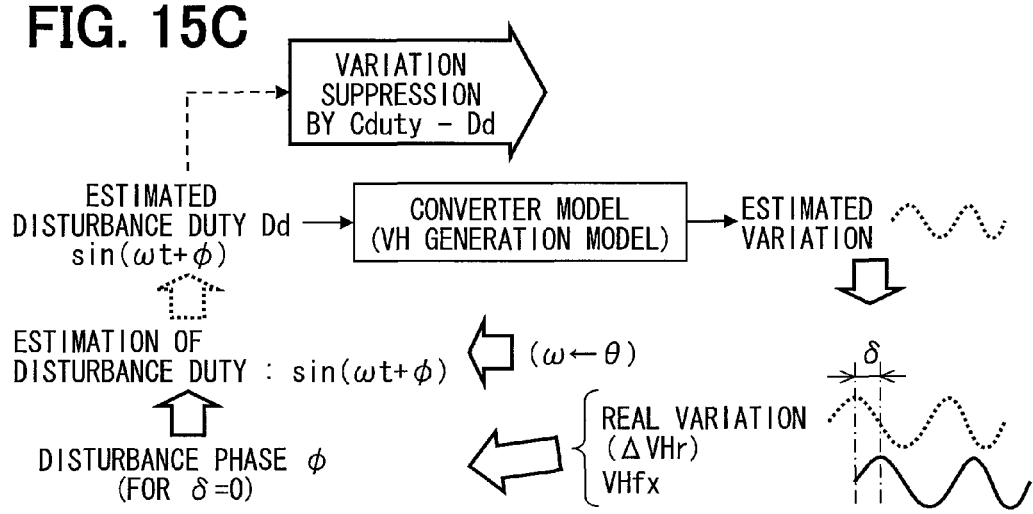

It is considered that estimating the current disturbance (i.e., estimating the disturbance-attributable duty contained in the input duty to the converter 6) and subtracting the estimated disturbance-attributable duty from the duty signal can make the duty eventually inputted to the converter 6 free of any disturbance-attributable duty and that such a configuration makes it possible to output the drive voltage VH including no variation portion VHf attributable to disturbance (ideally, only the steady-state voltage VHo), thereby realizing resonance suppression (FIG. 15C).

As stated in the foregoing, disturbance, in reality, occurs in synchronization with the rotation speed (electrical angular frequency ω) of the motor 61. Therefore, the input duty to the converter inclusive of a disturbance-attributable duty can be expressed as $K \cdot \sin(\omega t + \phi o)$. That is, a disturbance-attributable duty can be represented by a sinusoidal wave varying in synchronization with an electrical angular frequency ω. In the following, of the parameters of a disturbance-attributable duty, the electrical angular frequency ω may be referred to as the disturbance frequency ω, phase $\phi o$ may be referred to as disturbance phase $\phi o$, and $\omega t + \phi o$ may be referred to as a disturbance angle.

Where the amplitude K is regarded as a constant value (e.g., K=1), if the disturbance frequency ω can be obtained by whatever method and the disturbance phase $\phi o$ can be estimated, then the disturbance angle $(\omega t + \phi o)$ can be estimated. Hence, the disturbance-attributable duty can be estimated.

In the fourth embodiment, by obtaining the disturbance frequency ω and estimating the disturbance phase $\phi o$, the disturbance angle is estimated, then the disturbance-attributable duty is estimated. In the following, the estimated value of the disturbance phase $\phi o$ will be referred to as an estimated disturbance phase $\phi$ and an estimated value of the disturbance angle $(\omega t + \phi o)$ will be referred to as an estimated disturbance angle $\omega t + \phi$. Also, an estimated value of the disturbance-attributable duty (estimated disturbance duty) will be referred to as an estimated disturbance duty or an estimated disturbance-attributable duty Dd $(=\sin(\omega t + \phi))$.

The method for estimating the disturbance-attributable duty will be outlined with reference to FIG. 15C. Of the disturbance frequency ω and the disturbance phase $\phi o$, the disturbance frequency ω is, as stated above, the same as the electrical angular frequency $\phi$ of the motor 61, so that it can be calculated by obtaining information on the rotation angle of the motor 61. The disturbance frequency ω is calculated based on the rotation angle θ of the motor 61 outputted from the resolver 62.

The estimated sinusoidal disturbance-attributable duty Dd is then calculated using the disturbance frequency ω and the estimated value of the disturbance phase $\phi o$ (estimated disturbance phase $\phi$).

Estimation of the disturbance phase $\phi o$, i.e., calculation of the estimated disturbance phase $\phi$, is carried out using a control model (a forward model) of the converter 6 as follows.

A control model (converter model) 74 which is a model of the converter 6, to which a duty command signal is inputted and from which a target voltage VH is outputted, is prepared. By inputting a current (i.e., the latest) estimated disturbance-attributable duty Dd to the converter model 74, an estimated variation value VHfx, i.e., an output value corresponding to the input value, is determined. In this way, how the voltage outputted from the converter 6 will vary when the converter 6 is controlled using only the estimated disturbance-attributable duty Dd is estimated by calculation using the converter model 74 that is a control model equivalent to the converter 6.

If the estimated disturbance-attributable duty Dd is a correctly estimated one, the estimated variation value VHfx outputted from the converter model 74 and the real (actual) variation portion VHf should coincide with each other in phase. Conversely, when the phases of the estimated variation value VHfx and real variation portion VHf are shifted from each other, the disturbance-attributable duty has not been correctly estimated, i.e., the disturbance phase $\phi o$ has not been correctly estimated.

In this case, the estimated disturbance phase $\phi$ is updated by calculation (adjusted) so as to make the variation phase difference δ that is the difference between the phases of the estimated variation value VHfx and the real variation portion VHf 0, i.e., so as to make the phases of the estimated variation value VHfx and real variation portion VHf coincide with each other.

More specifically, the target deviation ΔV that is the deviation between the target voltage VO and the drive voltage VH actually outputted from the converter 6 is regarded as the real variation portion VHf of the drive voltage VH, and the phase of the target deviation ΔV is used as a comparison target. Since the target deviation ΔV contains plural kinds of frequency components, a real resonance variation value ΔVHr which is a really required (to be a comparison target) frequency component, i.e., a predetermined frequency component inclusive of the resonance frequency f, is extracted using a filter being described later.

Next, the variation phase difference δ between the real resonance variation value ΔVHr and the estimated variation value VHfx obtained from the converter model 74 is determined, and the current estimated disturbance phase φ is updated (adjusted) by calculation so as to make the variation phase difference δ 0 (so as to make the difference approach 0). This updates the estimated disturbance-attributable duty Dd (=sin(ωt+φ)).

When the estimated disturbance-attributable duty Dd based on the estimated disturbance phase φ thus updated (adjusted) is determined, the estimated disturbance-attributable duty Dd is again inputted to the converter model 74 and the variation phase difference δ is checked. The variation phase difference δ obtained at this time should be smaller than the previously obtained value. However, in cases where the variation phase difference δ thus determined has not yet reached 0, the above procedure is repeated to further update (adjust) the estimated disturbance phase φ.

In this way, based on the variation phase difference δ that is checked at every control period, the estimated disturbance phase φ is repeatedly updated to gradually approach the real value (the value that makes the variation phase difference δ to 0). The control period is shorter than the resonance period. The control period is, for example, about 1/50 of the resonance period.

The estimated disturbance-attributable duty Dd estimated by calculation at every control period is subtracted from the duty signal to correct the duty signal. The duty signal thus corrected is outputted as a final control duty to the converter 6. That is, the duty signal is, after being added to by the opposite-phase value of the estimated disturbance duty Dd, outputted as the control duty to the converter 6.

Through the above procedure, the estimated disturbance phase φ is allowed to come closer to a true value at every control period, thereby suppressing the variation of the drive voltage VH or, specifically, reducing the real resonance variation value ΔVHr (eventually bringing it to 0). That is, with the estimated disturbance-attributable duty Dd subtracted from the duty signal in advance, the disturbance subsequently mixed in is canceled by the duty portion corresponding to the estimated disturbance-attributable duty Dd. This allows, as a consequence, the duty signal to be inputted as it is (in a disturbance-free state) to the converter 6. Thus, the variation (resonance) of the drive voltage VH can be suppressed.

As described above, subtracting the estimated disturbance-attributable duty Dd from the duty signal is the theory of correction in the fourth embodiment. Based on the theory, in the boost control section 70 shown in FIG. 16, the resonance suppression section 71 generates the estimated disturbance duty Dd and outputs a corresponding opposite-phase signal (the estimated disturbance duty Dd with its phase inverted) as a correction value CV. The correction value CV is then added to the basic command value BV (equivalent to the duty signal) generated by the PI control section 12. That is, the basic command value BV is corrected by having the estimated disturbance-attributable duty Dd subtracted therefrom.

The resonance suppression section 71 includes, as shown in FIG. 16, a disturbance angle estimation section 72, a sinusoidal wave (sine wave) generation section 73, a VH generation model 74, a target deviation filter 75, a phase adjustment section 76 and an inversion calculation section 77.

The disturbance angle estimation section 72 calculates the estimated disturbance angle, ωt+φ. The disturbance frequency ω is calculated based on the rotation angle θ inputted from the resolver 62. The estimated disturbance phase φ is inputted from the phase adjustment section 76. The disturbance estimation section 72 calculates the estimated disturbance angle ωt+φ using the disturbance frequency ω and the estimated disturbance phase φ and outputs the calculated result to the sinusoidal wave generation section 73.

Based on the estimated disturbance angle ωt+φ calculated by the disturbance angle estimation section 72, the sinusoidal wave generation section 73 generates the estimated disturbance-attributable duty Dd (=sin(ωt+φ)).

The inversion calculation section 77 generates an opposite-phase estimated disturbance-attributable duty Dd signal by multiplying the estimated disturbance-attributable duty Dd by −G which is a negative gain. The opposite-phase signal is outputted as the correction value CV for input to the corrected command calculation section 14. At the corrected command calculation section 14, the basic command value BV from the PI control section and the correction value CV are added, i.e., the estimated disturbance-attributable duty Dd is subtracted (to be precise, subtraction of Dd·G) from the basic command value BV to thereby correct the basic command value BV.

Figure 17:
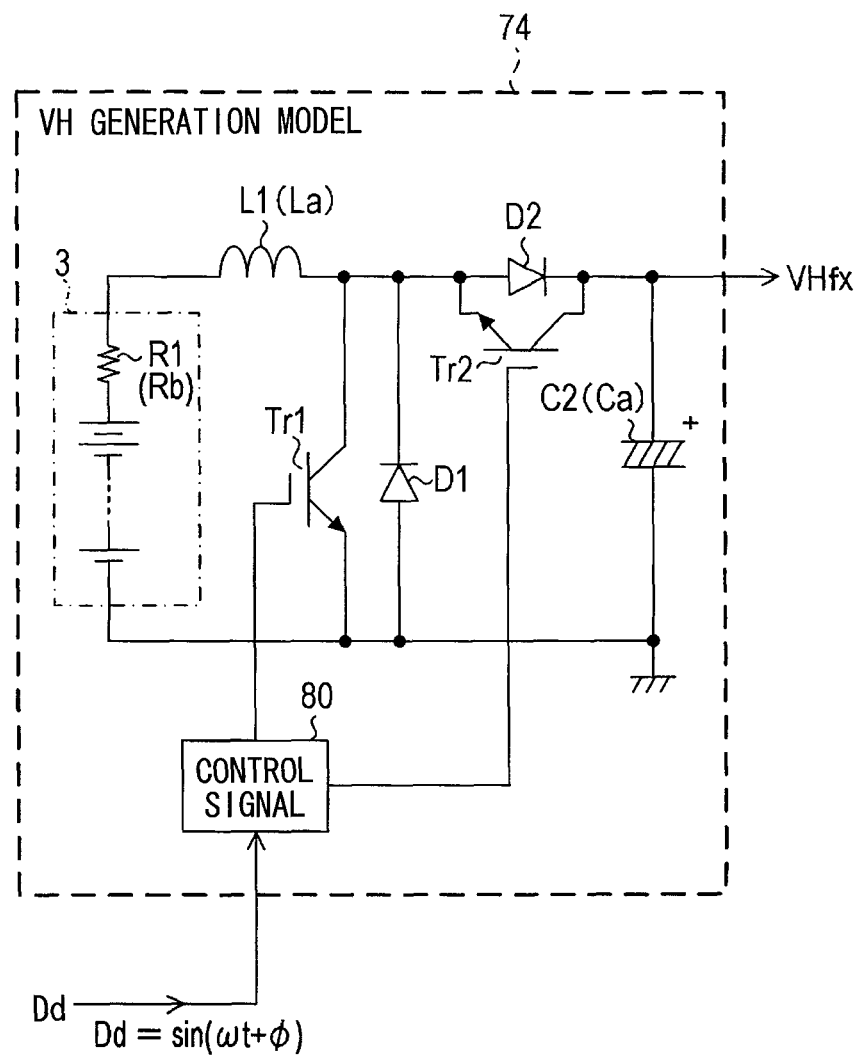
FIG. 17 is a circuit diagram showing a VH generation model in the fourth embodiment.

The VH generation model 74 is provided for estimating what drive voltage VH will be generated if the disturbance-attributable duty only (only the disturbance-attributable component of the whole control duty) is inputted to the converter 6, that is, for estimating what variation will be caused. The VH generation model 74 is, as shown in FIG. 17, a control model of the converter 6 itself. It is the same as the converter 74 shown in FIG. 15C. It is noted, however, that the VH generation model 74 does not include the filter capacitor C1 included in the converter 6 shown in FIG. 6. This is because the filter capacitor C1 being for stabilizing the voltage when the battery 3 is charged, i.e., when current flows from the inverter 7 to the battery 3, need not be taken into consideration for boosting, i.e., when generating the drive voltage VH.

Since the VH generation model 74 is for outputting the estimated variation value VHfx corresponding to the input of the estimated disturbance-attributable duty Dd, it is provided with a control signal generation section 80 which generates control signals to control the arm switches Tr1 and Tr2 based on the estimated disturbance-attributable duty Dd inputted thereto. The functions of the control signal generation section 80 are basically the same as the functions realized by the configuration including, as shown in FIG. 3, the switching pulse generation section 16, the dead time processing section 17, and the inversion and dead time processing section 18.

Since the VH generation model 74 is formed of an LCR resonance circuit as shown in FIG. 17, its transfer function can be represented, using an s-function (Laplace operator s), by the following equation (4).

$$VHfx = \frac{Dd}{s^2 + \frac{Rb}{La}s + \frac{d0^2}{La \cdot Ca}} \quad (4)$$

In the above equation: Rb is the resistance of internal resistor R1 in battery 3; La is the inductance of the reactor L1; Ca is the capacitance of the smoothing capacitor C2, and d0 is the boost ratio (VL/VH) of the VH generation model 74 (i.e., boost ratio of the converter 6).

Since s=jω, when the above equation (4) is inverse Laplace transformed, the estimated variation value VHfx is represented by the following equation (5).

$$VHfx = Kv \cdot \sin(\omega o t + \Psi) \tag{5}$$

where Kv is a steady-state voltage value, ωo is the resonance angle frequency of the LCR resonance circuit included in the VH generation model 74, and Ψ is a phase delay.

To estimate the disturbance phase φo (to calculate the estimated disturbance phase φ), the phase of the estimated variation value VHfx generated at the VH generation model 74 is used, so that a specific value of the steady-state voltage Kv is not required. That is, it is only the phase information (phase delay Ψ) that is required by the phase adjustment section 76 on the rear stage side. Therefore, the estimated variation value VHfx of the equation (5) may be outputted with Kv left indefinite. Accordingly, the estimated variation value VHfx represented by equation (5) is inputted to the phase adjustment section 76.

The target deviation filter 75 eliminates the harmonic noise component of the target deviation ΔV (i.e., superimposed with the drive voltage VH). Specifically, using a frequency higher than the resonance frequency f but lower than two times the resonance frequency f as a cutoff frequency, the frequency component not lower than the cutoff frequency is removed and the remaining portion of the signal is outputted as a real resonance variation value ΔVHr.

The phase adjustment section 76 updates by calculation (adjusts) the estimated disturbance phase φ so as to make the variation phase difference δ to 0, i.e., so as to make the phases of the estimated variation value VHfx and real resonance variation value ΔVHr coincide with each other. The variation phase difference δ is the phase difference between the real resonance variation value ΔVHr inputted from the target deviation filter 75 and representing the waveform of the real resonance (disturbance) and the estimated variation value VHfx inputted from the VH generation model 74.

Figure 18A:
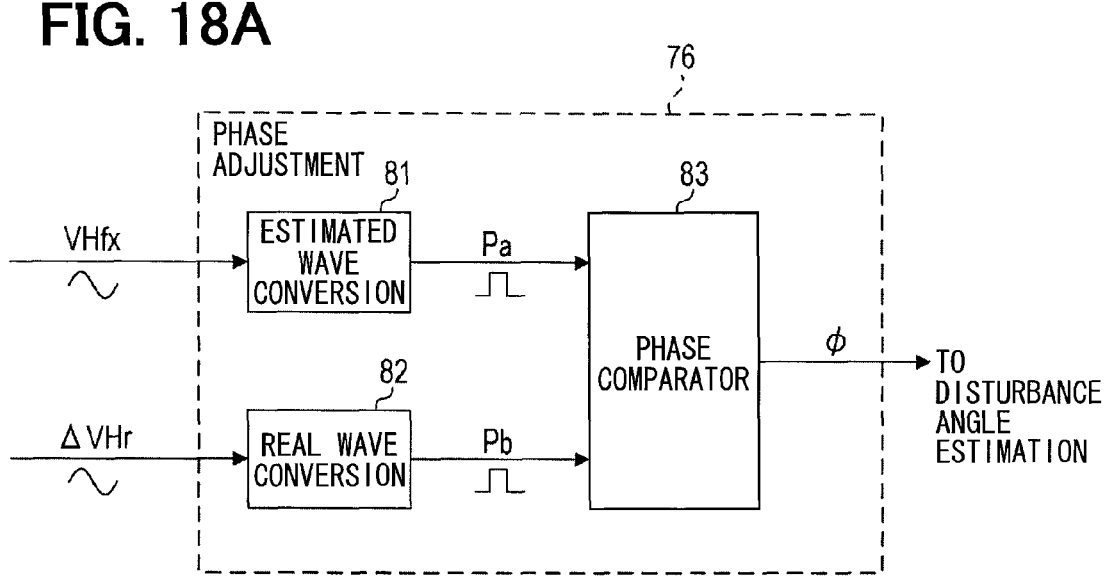
FIGS. 18A and 18B are a circuit diagram showing a phase adjustment section in the fourth embodiment and a signal diagram showing its operation, respectively.

The phase adjustment section 76 includes, as shown in FIG. 18A, an estimated waveform pulse conversion section 81, a real waveform pulse conversion section 82, and a phase comparator 83.

Figure 18B:
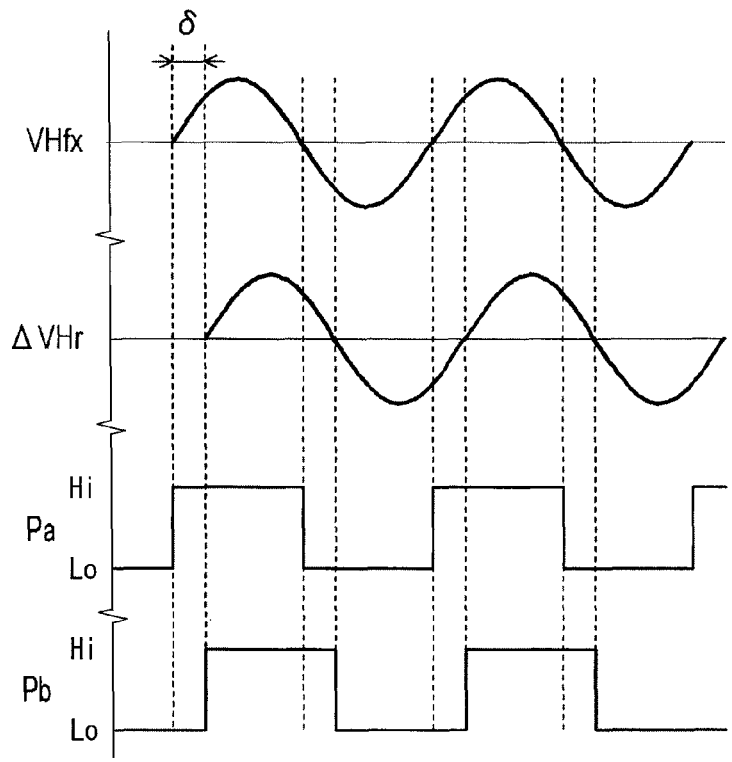

The estimated waveform pulse conversion section 81 generates an estimated variation pulse signal Pa by converting, as shown in FIG. 18B, the waveform of the estimated variation value VHfx received from the VH generation model 74 into pulses based on the zero-crossing timing of the waveform.

The real waveform pulse conversion section 82 generates a real variation pulse signal Pb by converting, as shown in FIG. 18B, the waveform of the real resonance variation value ΔVHr received from the target deviation filter 75 into pulses based on the zero-crossing timing of the waveform.

The phase comparator 83 updates by calculation (adjusts) the estimated disturbance phase φ so as to bring to 0 the variation phase difference δ that is the phase difference between the estimated variation pulse signal Pa and the real variation pulse signal Pb. The specific function of the phase comparator 83 will be described with reference to FIG. 19.

Figure 19:
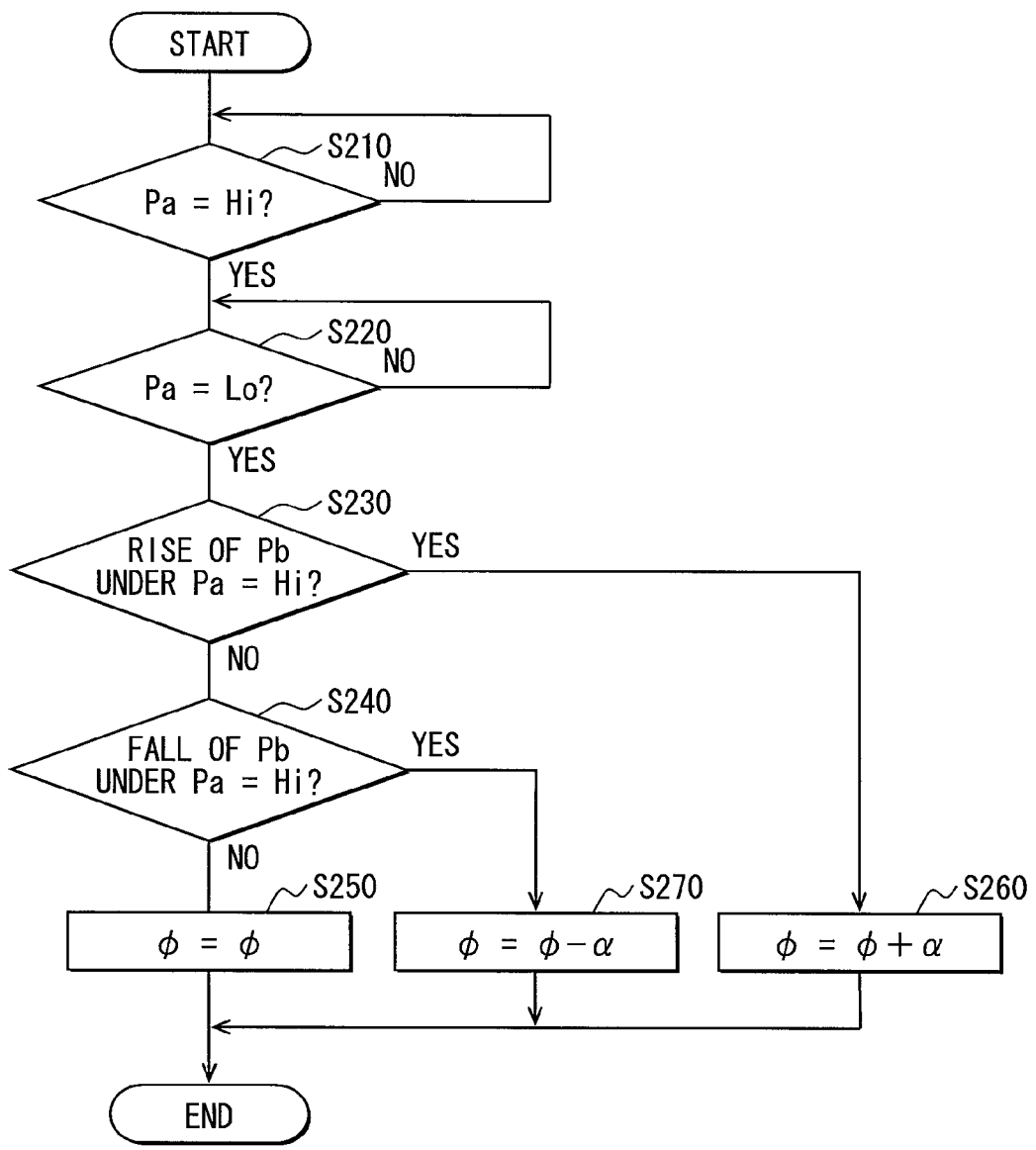
FIG. 19 is a flowchart showing operation logic of a phase comparator in the fourth embodiment.

The phase comparator 83 executes the operation logic shown in FIG. 19 at calculation timing in every control period. That is, as shown in FIG. 19, first, it is checked at S210 whether the estimated variation pulse signal Pa has risen to Hi (high level). When Pa is determined to have risen to Hi, it is then checked at S220 whether the signal Pa has fallen to Lo (low level). If, during this time, the real variation pulse signal Pb undergoes an edge change, the content of the edge change is stored in the memory.

When Pa falls to Lo, it is checked at S230 whether a rising edge of Pb was detected during the time Pa was at Hi is determined. When it is determined that no rising edge of Pb was detected during the time Pa was at Hi, it is further checked at S240 whether a falling edge of Pb was detected during the time Pa was at Hi (S240).

When it is determined that no falling edge of Pb was detected during the time Pa was at Hi, Pa and Pb are determined to be in phase, so that the current estimated disturbance phase φ (i.e., the last estimated disturbance phase φ calculated and stored at the previous calculation timing) is stored, as it is, as the latest estimated disturbance phase φ having been updated (adjusted) at the latest calculation timing. That is, Pa and Pb being in phase section that the estimated disturbance phase φ has reached a true value, so that its current value is maintained.

When, it is determined at 5230 that the rising edge of Pb was detected during the time Pa was at Hi, Pa is ahead of Pb in phase. In this case, it is necessary to delay the current estimated disturbance phase φ so as to delay the phase of Pa.

Conversely, when, it is determined at S240 that the falling edge of Pb was detected during the time Pa was at Hi, Pa is behind Pb in phase. In this case, it is necessary to advance the current estimated disturbance phase φ so as to advance the phase of Pa.

A phase adjustment angle α is preset as a phase amount for phase adjustment (addition or subtraction) at each calculation timing. The phase adjustment angle α is a positive constant. When Pa is found ahead of or behind Pb in phase at the calculation timing during the control period, the estimated disturbance phase φ is updated (adjusted) by adding or subtracting the phase adjustment angle α thereto or therefrom.

Specifically, when the phase of Pa is ahead of the phase of Pb (S230: YES), the phase adjustment angle α is added to the current estimated disturbance phase φ at S260 thereby updating (adjusting) the estimated disturbance phase φ and the estimated disturbance phase φ thus updated is stored as the latest estimated disturbance phase φ. Conversely, when the phase of Pa is behind the phase of Pb (S240: YES), the phase adjustment angle α is subtracted from the current estimated disturbance phase φ at S270 thereby updating (adjusting) the estimated disturbance phase φ and the estimated disturbance phase φ thus updated is stored as the latest estimated disturbance phase φ.

As described above, the estimated disturbance phase φ is caused to gradually approach a true value by being adjusted little by little (by α at a time) at every control period. As the estimated disturbance phase φ gradually approaches the true value, the variation of the drive voltage VH gradually becomes smaller causing the waveform amplitude of the real resonance variation value ΔVHr to gradually become smaller. When it eventually occurs that no edge change is detected in the real variation pulse signal Pb, the estimated disturbance phase φ is considered to have reached the true value.

The phase adjustment angle α may be appropriately determined. For example, it may be calculated in advance by using the following equation (6).

$$\alpha = \frac{\pi}{N \cdot \frac{T1}{T2}} \tag{6}$$

In the above equation (6), T1 is a resonance period [s], T2 is a control period [s], and N is a maximum number of resonance periods usable for adjustment. The resonance period T1 is the reciprocal of the resonance frequency f dependent on the circuit constant of the converter 6.

The phase difference between the estimated variation value VHfx and the real resonance variation value ΔVHr both inputted to the phase adjustment section 76 is 180 degrees (π radians) at a maximum. In other words, the maximum adjustable width of the estimated disturbance phase φ is 180° (π radians). The phase adjustment angle α is determined based on the premise that the maximum phase difference (π radians) is controlled to be decreased to 0 over N times the resonance period T1. Even though the maximum number N of resonance periods usable for adjustment is basically 1 or larger (N≥1), when it is small, the magnitude of phase change per adjustment becomes large resulting in a large variation of the battery voltage VL. Generally, therefore, N is preferred to be 10 or larger (N≥10).

The magnitude A1 of phase shift to be effected per resonance period T1 (to be effected during one resonance period T1) is represented by the following equation (7).

$$A1 = \pi/N \tag{7}$$

The phase adjustment angle α is to be added to or subtracted from the estimated disturbance phase φ at every control period T2. The number of control periods T2 included in each resonance period T1 is T1/T2. To adjust phase A1 represented by the above equation (7) by repeating adjustment T1/T2 times, the phase adjustment angle α is required to be A1/(T1/T2). This means that the phase adjustment angle α can be obtained from the above equation (6).

Figure 20:
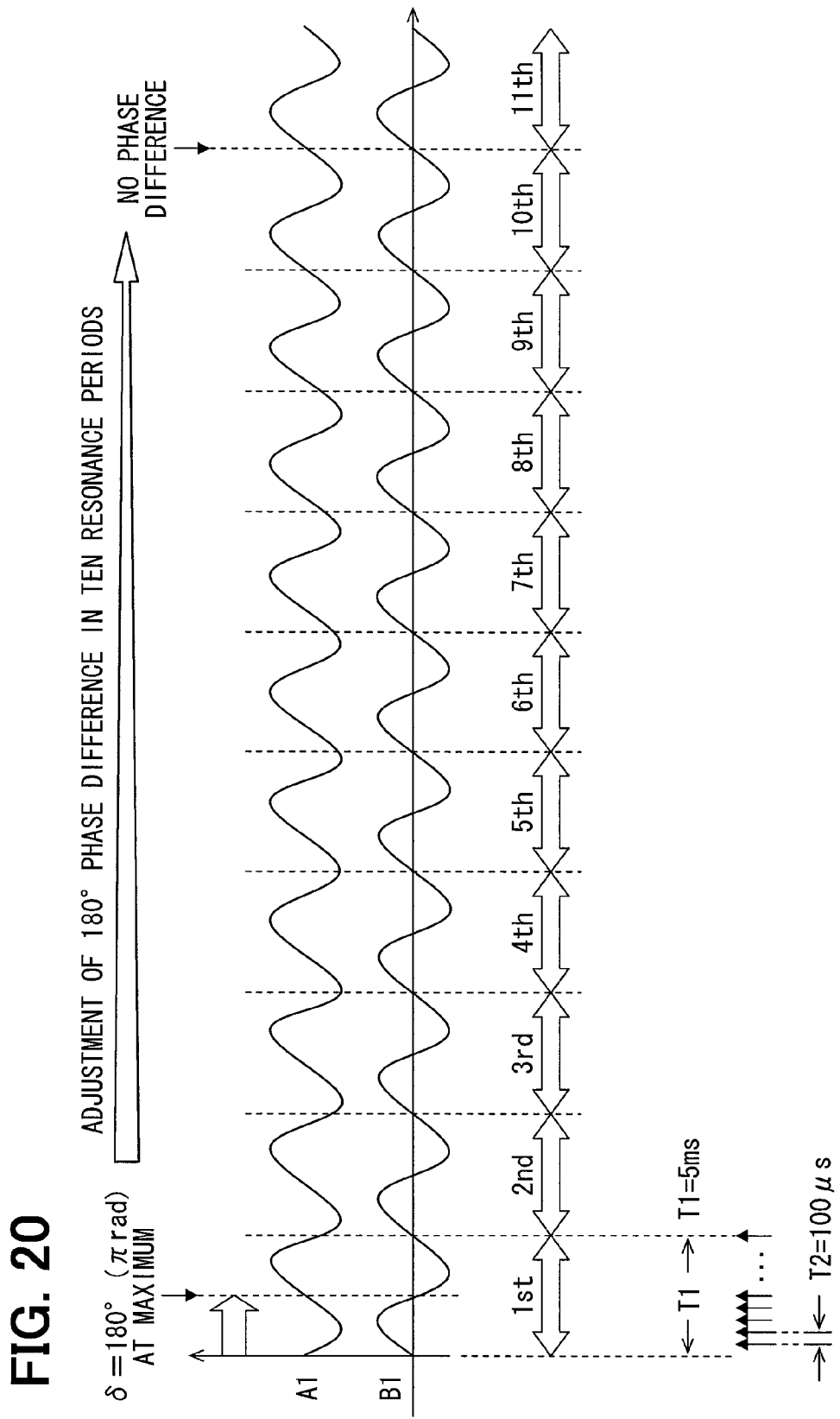
FIG. 20 is a signal diagram showing determination of a phase adjustment angle α in the fourth embodiment.

An example of determining the phase adjustment angle α will be described with reference to FIG. 20. In this example, it is assumed that the resonance frequency f is 200 Hz and the control frequency is 10 kHz. In this case, the resonance period T1 is 5 ms and the control period T2 is 100 μs. The maximum number of resonance periods usable for adjustment is set to 10, i.e., up to 180 degrees (π radians) of phase adjustment can be made using 10 resonance periods T1.

In this case, the phase adjustment angle α calculated by applying the above equation (6) is π/500. This phase adjustment angle α (=π/500) makes it possible to shift the estimated disturbance phase φ 180° using 10 resonance periods T1.

Adjustment of the estimated disturbance phase φ, i.e., addition or subtraction of the phase adjustment angle α to or from the estimated disturbance phase φ, is performed at every control period T2 (every 100 μs). Therefore, phase adjustment can be performed 50 times in one resonance period T1. Hence, in 10 resonance periods T1, there are 500 opportunities for performing phase adjustment. In the example, 180° (π radians) of phase adjustment is to be performed by repeating phase adjustment 500 times, so that the phase adjustment angle α per phase adjustment (per control period 2T) is π/500. This agrees with the above calculation result.

According to the boost control section 70, based on the assumption that the disturbance that causes variation of the drive voltage VH mixes in the duty signal (basic command value BV), the disturbance component (estimated disturbance-attributable duty Dd) is estimated by calculation, and the estimated disturbance-attributable duty Dd is subtracted in advance from the basic command value BV. As a result, the variation, caused by the torque variation of the motor 61, of the voltage outputted from the converter (drive voltage VH) can be suppressed. Hence, the increase in torque variation caused when the torque variation frequency and the resonance frequency f coincide (resonance) can also be effectively suppressed.

Since, disturbance is estimated by the disturbance observer method at every control period, the variation of the drive voltage VH can be suppressed (resonance suppression) without depending on the motor rotation speed.

Even though, in the fourth embodiment, the amplitude K of the estimated disturbance-attributable duty Dd (=sin(ωt+φ)) is fixed at 1 (K=1) and virtually no consideration is given to the amplitude K, the amplitude K may also be adjusted (estimated) appropriately so as to allow the estimated disturbance-attributable duty (K·sin(ωt+φ)) to be estimated by calculation with the amplitude K also taken into consideration.

Also, the configuration may be arranged such that: the estimated disturbance-attributable duty Dd generated at the sinusoidal wave generation section 73 is outputted as the correction value CV either as it is or after being multiplied by a positive gain and the correction value CV is subtracted from the basic command value BV outputted from the PI control section 12.

Even though, in the phase adjustment section 76, the two input waveforms (VHfx and ΔVHr) are converted into pulses for phase comparison as described with reference to FIGS. 18A and 18B, they need not necessarily be converted into pulses. As long as the phase difference between the two input waveforms (whether one is behind or ahead of the other) can be known and the estimated disturbance phase φ can be generated based on the phase difference, the phase adjustment section 76 may be configured differently.

In the fourth embodiment, the adjustment amount to be applied to the estimated disturbance phase φ at every control period is adjusted by setting the phase adjustment angle α and adding or subtracting the phase adjustment angle α to or from the adjustment amount. The phase adjustment amount may be determined appropriately. For example, plural phase adjustment angles may be set to allow one of them to be selected for use depending on the magnitude of the variation phase difference δ. More specifically, when the variation phase difference δ is larger, a larger phase adjustment angle may be used so as to bring the estimated disturbance phase φ to a true value faster.

It is noted, however, that, even though using a larger phase adjustment angle when the variation phase difference δ is larger will be appropriate from the viewpoint of bringing the estimated disturbance phase φ to a true value faster, using a larger phase adjustment angle causes the estimated disturbance phase φ to change more sharply. Sharply changing the estimated disturbance phase φ causes the potentials at midpoints (connection points) of the arm switches Tr1 and Tr2 included in the converter 6 to largely vary (i.e., the battery voltage VH largely varies) to possibly make control unstable.

Sharply changing the estimated disturbance phase φ is, therefore, undesirable from the viewpoint of control stability. It is, therefore, preferable to make the estimated disturbance phase φ gradually approach the true value by changing the estimated disturbance phase φ little by little (by the phase adjustment angle α at a time) as in the fourth embodiment.

(Modification)

The above-described embodiments may be modified in various ways.

For example, even though, in the first to the third embodiments described above, the correction value CV is set to be either the positive correction constant B or the negative correction constant −B, using such a positive or negative correction constant is only an example method. The correction value CV may be determined by calculation so as to allow it to change continuously or in steps according to the difference value. That is, as long as the basic command value BV can be corrected in the direction for suppressing the amplitude variation of the drive voltage VH in the resonance frequency band, the correction value CV may be set or calculated in various ways.

The booster circuit is not limited to the booster circuit 5 described above. The booster circuit may be any type as far as it is provided with a converter which includes an LC resonance circuit and whose output power periodically varies by being affected by a circuit receiving the output power, i.e., whose output power is synchronized with a resonance frequency by being affected by the circuit receiving the output power.

Also, it is only an example case that the basic command value BV is calculated by the PI control section 12. The basic command value BV may be calculated by a different type of control unit. Calculating the basic command value BV using feedback control is also a mere example.

Figure 21:
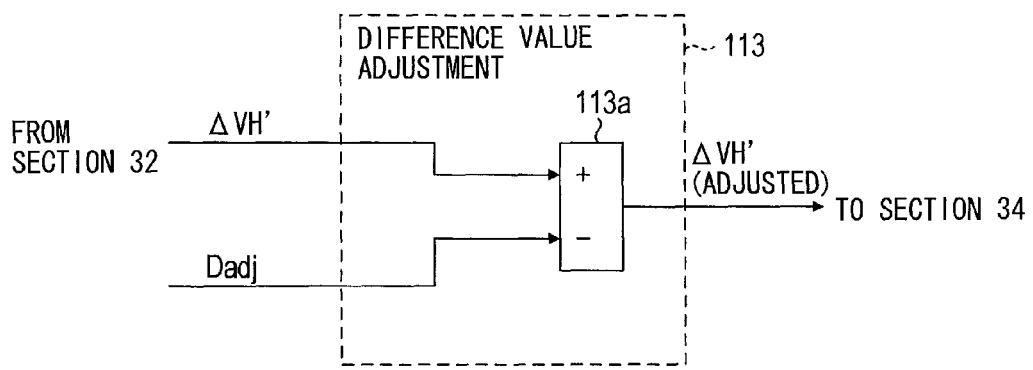
FIG. 21 is a circuit diagram showing a difference value adjustment section.

Furthermore, a section having a function equivalent to that (adjustment function) of the correction value adjustment section 93 described in connection with the second embodiment may be placed between the difference calculation section 32 and the correction section 34. Specifically, a difference value adjustment section 113 shown in FIG. 21 (corresponding to the difference adjustment section) may be provided between the difference calculation section 32 and the correction section 34.

The difference value adjustment section 113 adjusts, at a subtractor 113*a*, the difference value by subtracting the adjustment amount Dadj calculated at the adjustment amount calculation section 92 from the difference value of the drive voltage VH outputted from the difference calculation section 32. In this way, the difference value attributable to resonance that does not include the variation portion of the target voltage VO can be calculated. In this configuration, when the variation of the target voltage VO and the resonance of the drive voltage VH coincide, the variation of the target voltage VO can be taken into consideration. As a result, excessive correction can be avoided.

Similarly, the correction value adjustment section 103 shown in FIG. 13 and described in connection with the third embodiment may be disposed between the difference calculation section 32 and the correction section 34 so that it can be used as a difference value adjustment section.

Figure 22:
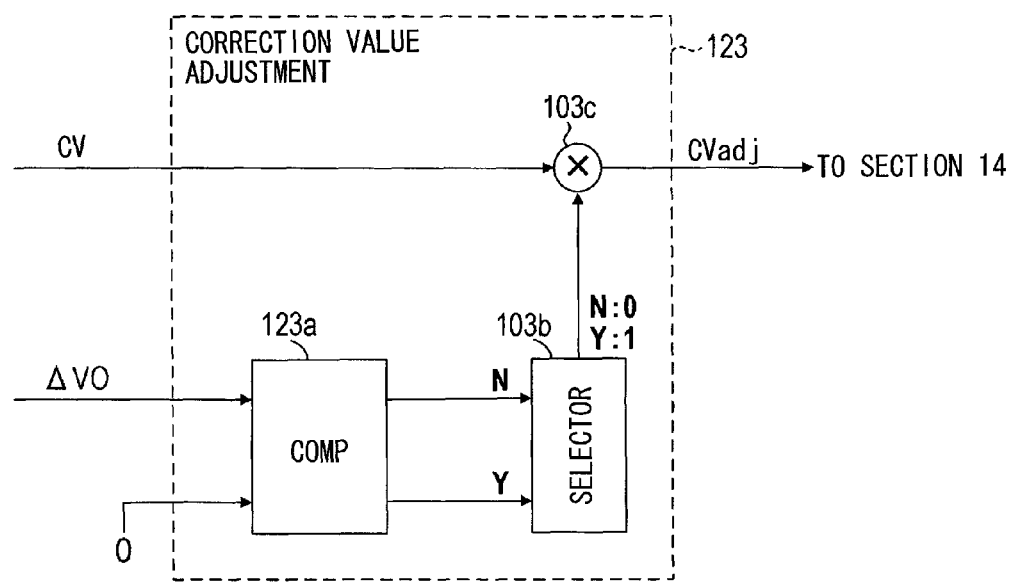
FIG. 22 is a circuit diagram showing a modification example of the correction value adjustment section shown in FIG. 21.

By using a correction value adjustment section 123 configured as shown in FIG. 22, the adjustment amount calculation section 92 may be omitted. The correction value adjustment section 123 is configured such that, when the variation rate ΔVO of the target voltage VO is 0, the correction value CV from the correction section 34 is inputted to the corrected command calculation section 14. More specifically, it is checked whether the variation rate ΔVO is 0 by a comparison section 123*a*. When the variation rate ΔVO is 0, the multiplier for a multiplier 103*c* is set to 1 by a selector 103*b*. When the variation rate ΔVO is not 0, the multiplier for the multiplier 103*c* is set to 0 by the selector 103*b*. In this configuration, the variation rate ΔVO of the target voltage VO is prevented from affecting the correction command.

Furthermore, in the adjustment amount calculation section 92, maximum and minimum guard values (maximum and minimum limit values) may be applied to the adjustment amount Dadj to be calculated. The maximum and minimum guard values may be calculated by providing an additional calculation section or they may be designed and stored beforehand.

The threshold value Vth used in the correction value adjustment section 103 shown in FIG. 13 need not be a fixed value. It may be, for example, dependent on the drive voltage VH. Outputting of the adjusted correction value CVadj from the correction value adjustment section 103 shown in FIG. 13 may be made conditional, for example, such that the adjusted correction value CVadj is outputted only when the variation rate ΔVO is within the predetermined range.

The above described embodiments should not be limited to electric vehicles. The embodiments may be applied to, for example, hybrid vehicles each provided with both an internal combustion engine and a motor as drive sources. That is, the embodiments may be applied to any type of vehicle provided with a motor drive system in which a DC voltage is boosted by a booster circuit and the boosted voltage is used to drive a motor used as a vehicle drive source.

What is claimed is:

1. A converter control device for a vehicle having a converter, which includes a resonance circuit formed of a capacitor and a coil and generates a drive voltage for driving a motor by converting a DC voltage supplied from a DC power source into a DC drive voltage at a conversion ratio determined based on an input control signal, the converter control device comprising:
   a basic command value calculation section which, to equalize the drive voltage generated by the converter with a predetermined target voltage, calculates a basic command value based on the target voltage;
   a variation state detection section which detects a state of variation of the drive voltage outputted from the converter;
   a correction value calculation section which calculates, based on the variation state of the drive voltage, a correction value for correcting the basic command value to suppress the variation of the drive voltage; and
   a control signal generation section which calculates a control command value by correcting, using the correction value, the basic command value, generates the control signal according to the control command value and outputs the control signal to the converter; wherein:
   the variation state detection section detects the variation state by calculating a variation rate of the drive voltage outputted from the converter at each predetermined detection timing; and
   the correction value calculation section calculates, based on the variation rate, the correction value that reduces an absolute value of the variation rate;
   the variation state detection section includes
      a voltage detection section which detects the drive voltage outputted from the converter at the each detection timing in a predetermined detection period, and
      a difference calculation section which, at the each detection timing, calculates as the variation rate a difference between the drive voltage detected by the voltage detection section at the each detection timing and the drive voltage detected at detection timing in an earlier detection period; and
   the correction value calculation section calculates, based on the difference, the correction value that reduces an absolute value of the difference.

2. The converter control device according to claim 1, wherein:
   the correction value calculation section includes a difference determination section which determines whether the absolute value of the difference is larger than a predetermined difference threshold value, and calculates the correction value when the absolute value of the difference is larger than the difference threshold value.

3. The converter control device according to claim 2, wherein:

the correction value calculation section has a predetermined positive correction constant and a predetermined negative correction constant, and sets either the positive correction constant or the negative correction constant as the correction value depending on whether the difference is positive or negative to reduce the absolute value of the difference when the absolute value of the difference is larger than the difference threshold value.

4. The converter control device according to claim 2, wherein:
the difference threshold value is set not to be exceeded by the absolute value of the difference when an electrical angular frequency of the motor is lower than a predetermined frequency band including a resonance frequency of the resonance circuit.

5. The converter control device for vehicle according to claim 1, wherein:
the two drive voltages to be calculation targets when the difference calculation section calculates the difference are detected at different times which are apart from each other by one half or less of a resonance period of the resonance circuit.

6. The converter control device according to claim 5, wherein:
the variation state detection section has a filter section which receives the drive voltage and removes from the drive voltage a frequency component higher than a predetermined frequency band including a resonance frequency of the resonance circuit; and
the variation detection section detects a variation state of the drive voltage having had the frequency component removed by the filter section.

7. The converter control device for vehicle according to claim 1, further comprising:
a target voltage variation rate calculation section which calculates a variation rate of the target voltage;
an adjustment amount calculation section which calculates an adjustment amount for the correction value according to the variation rate of the target voltage; and
a correction value adjustment section which adjusts, based on the adjustment amount, the correction value.

8. The converter control device according to claim 1, further comprising:
a target voltage variation rate calculation section which calculates a variation rate of the target voltage;
an adjustment amount calculation section which calculates an adjustment amount for the difference according to a variation rate of the target voltage calculated by the target voltage variation rate calculation section; and
a difference adjustment section which adjusts the difference based on the adjustment amount.

9. The converter control device according to claim 1, wherein:
the basic command value calculation section compares the target voltage and the drive voltage, and calculates the basic command value to equalize the drive voltage and the target voltage.

10. A converter control device for a vehicle having a converter, which includes a resonance circuit formed of a capacitor and a coil and generates a drive voltage for driving a motor by converting a DC voltage supplied from a DC power source into a DC drive voltage at a conversion ratio determined based on an input control signal, the converter control device comprising:
a basic command value calculation section which, to equalize the drive voltage generated by the converter with a predetermined target voltage, calculates a basic command value based on the target voltage;
a variation state detection section which detects a state of variation of the drive voltage outputted from the converter;
a correction value calculation section which calculates, based on the variation state of the drive voltage, a correction value for correcting the basic command value to suppress the variation of the drive voltage; and
a control signal generation section which calculates a control command value by correcting, using the correction value, the basic command value, generates the control signal according to the control command value and outputs the control signal to the converter; wherein:
the variation state detection section detects, as the variation state, a target deviation which is a difference between the target voltage and the drive voltage;
the correction value calculation section includes
an electrical angular frequency detection section which detects an electrical angular frequency of the motor,
a sinusoidal signal generation section which generates, as the correction value, a sinusoidal signal of a frequency identical with the electrical angular frequency, and
a phase setting section which sets a phase of the sinusoidal signal such that a phase of an estimated output voltage expected to be outputted from the converter when the sinusoidal signal generated by the sinusoidal signal generation section is used as the control command value and a phase of the target deviation with each other;
the sinusoidal signal generation section generates the sinusoidal signal that varies with the phase set by the phase setting section and the angle determined by the electrical angular frequency; and
the control signal generation section calculates the control command value by subtracting the sinusoidal signal used as the correction value from the basic command value.

11. The converter control device according to claim 10, wherein:
the phase setting section includes
an estimated output voltage calculation section which calculates the estimated output voltage, and
a phase calculation section which compares the phase of the estimated output voltage and the phase of the target deviation, and calculates the phase of the sinusoidal signal so as to equalize the phase of the estimated output voltage and the phase of the target deviation.

12. The converter control device according to claim 11, wherein:
the estimated output voltage calculation section includes a control model of the converter to which the control command value is inputted and makes a voltage outputted from the control model when the sinusoidal signal is inputted to the control model the estimated output voltage.

13. The converter control device according to claim 11, wherein:
the phase calculation section calculates the phase of the sinusoidal signal at every calculation timing in each predetermined period by delaying the current phase of the sinusoidal signal by a predetermined phase adjustment angle when the phase of the estimated output voltage is ahead of the phase of the target deviation, or by advancing a current phase of the sinusoidal signal by the predetermined phase adjustment angle when the phase of the estimated output voltage is behind the phase of the target deviation.

14. The converter control device according to claim 10, further comprising:

a filter section which removes, from the target deviation, a frequency component higher than a predetermined frequency band including a resonance frequency of the resonance circuit, wherein the phase setting section sets the phase of the sinusoidal signal based on the target deviation having had the frequency component removed by the filter section.

* * * * *